United States Patent
Tanimura et al.

(10) Patent No.: US 11,862,865 B2
(45) Date of Patent: Jan. 2, 2024

(54) METHOD AND DEVICE FOR DETECTING TARGET

(71) Applicant: Furuno Electric Co., Ltd., Nishinomiya (JP)

(72) Inventors: Shinya Tanimura, Auckland (NZ); Yasunobu Asada, Auckland (NZ)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 583 days.

(21) Appl. No.: 17/109,205

(22) Filed: Dec. 2, 2020

(65) Prior Publication Data

US 2021/0167498 A1 Jun. 3, 2021

(30) Foreign Application Priority Data

Dec. 3, 2019 (JP) ................. 2019-218838

(51) Int. Cl.
*H01Q 3/36* (2006.01)
*G01S 7/41* (2006.01)
*G01S 7/03* (2006.01)
*G01S 13/91* (2006.01)
*G01S 15/88* (2006.01)
*G01S 7/539* (2006.01)

(52) U.S. Cl.
CPC ............... *H01Q 3/36* (2013.01); *G01S 7/03* (2013.01); *G01S 7/412* (2013.01); *G01S 7/539* (2013.01); *G01S 13/91* (2013.01); *G01S 15/88* (2013.01)

(58) Field of Classification Search
CPC .. H01Q 3/36; G01S 7/03; G01S 7/412; G01S 7/539; G01S 13/91; G01S 15/88
See application file for complete search history.

(56) References Cited

U.S. PATENT DOCUMENTS

| 7,606,114 B2 | 10/2009 | Bachelor et al. |
| 11,194,032 B2* | 12/2021 | Cetinoneri ............. G01S 13/04 |
| 11,333,757 B2* | 5/2022 | Wanis .................... G01S 7/527 |
| 2010/0265123 A1* | 10/2010 | Lancashire .......... G01S 13/904 |
| | | 342/372 |

(Continued)

FOREIGN PATENT DOCUMENTS

JP 47-26160 10/1972

*Primary Examiner* — Bernarr E Gregory
*Assistant Examiner* — Kenneth W Good
(74) *Attorney, Agent, or Firm* — XSENSUS LLP

(57) ABSTRACT

A target detection device is provided, which includes a transmission array and a signal generator. The transmission array includes a plurality of transmission elements configured to convert an electric signal into a transmission wave. The signal generator generates first and second sets of electric signals, each set being generated with different phase settings. The signal generator groups the transmission elements according to grouping configurations including first and second grouping configurations. In the first grouping configuration, the plurality of transmission elements are grouped into a plurality of groups each having p transmission elements, and, in the second grouping configuration, the plurality of transmission elements are grouped into a plurality of groups each having q transmission elements. The signal generator inputs the first set of electric signals to each group of the first grouping configuration, and inputs the second set of electric signals to each group of the second grouping configuration.

18 Claims, 23 Drawing Sheets

(56) References Cited

U.S. PATENT DOCUMENTS

| | | | |
|---|---|---|---|
| 2013/0234890 A1* | 9/2013 | Chethik | H01Q 3/267 |
| | | | 342/374 |
| 2018/0100922 A1 | 4/2018 | Wigh et al. | |
| 2019/0293753 A1* | 9/2019 | Iwasa | G01S 7/2813 |
| 2019/0334238 A1* | 10/2019 | Honda | H04B 7/0682 |
| 2020/0021039 A1* | 1/2020 | Pelletti | G01S 7/03 |
| 2020/0355793 A1* | 11/2020 | Lee | G01S 7/41 |
| 2022/0163623 A1* | 5/2022 | Kishigami | G01S 13/42 |

* cited by examiner

GROUP GR1 / 95kHz

GROUP GR1 / 100kHz

GROUP GR2 / 135kHz

GROUP GR2 / 150kHz

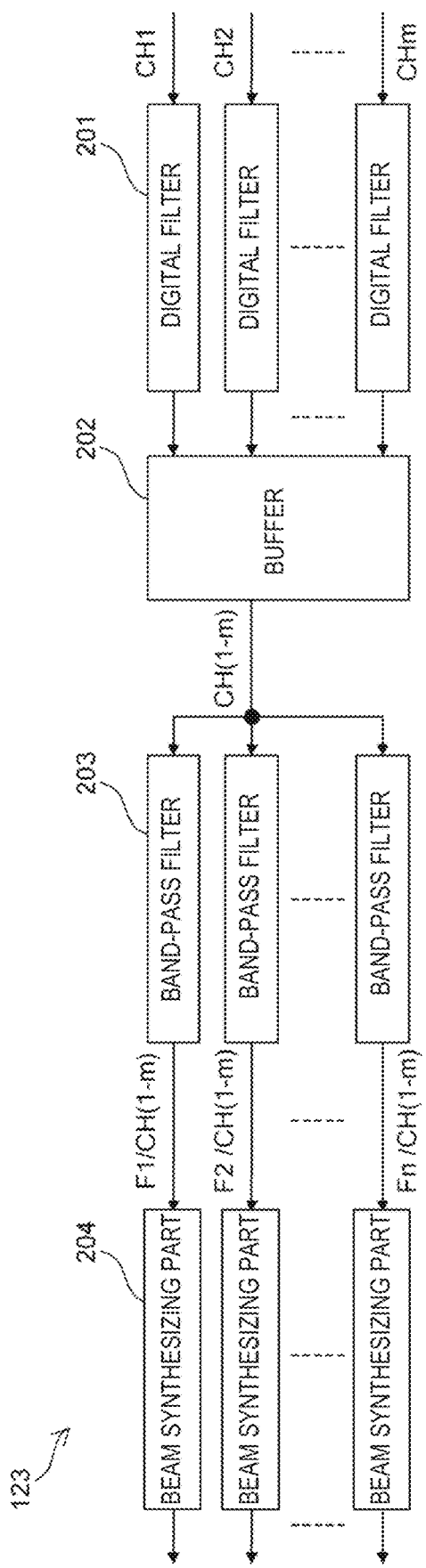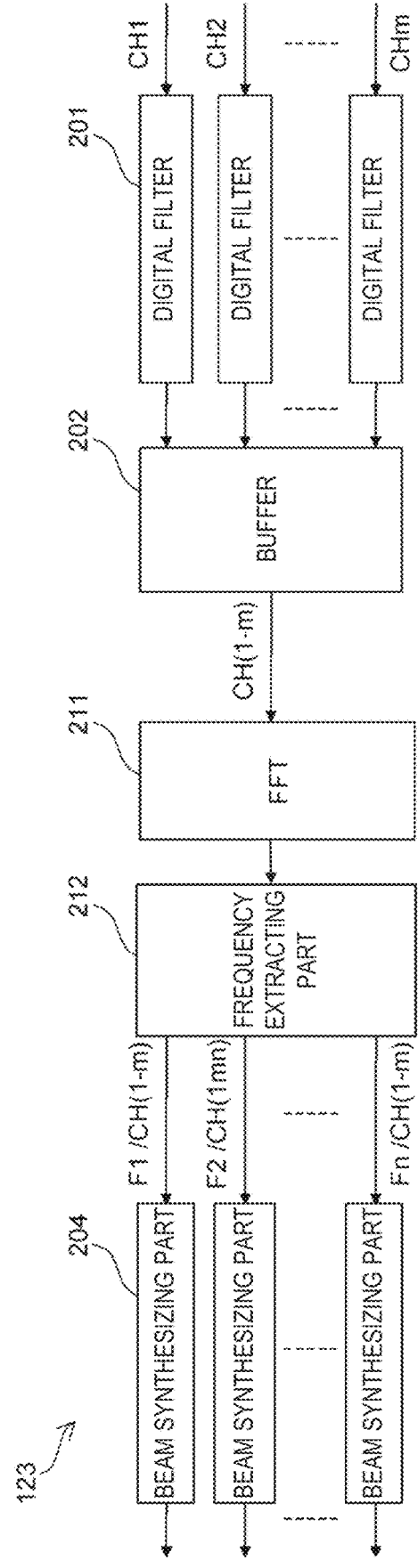

GROUP GR2 / 155kHz

GROUP GR2 / 165kHz

METHOD AND DEVICE FOR DETECTING TARGET

CROSS-REFERENCE TO RELATED APPLICATION

This application claims priority under 35 U.S.C. § 119 to Japanese Patent Application No. 2019-218838, which was filed on Dec. 3, 2019, the entire disclosure of which is hereby incorporated by reference.

TECHNICAL FIELD

The present disclosure relates to a target detection device and a target detecting method which transmit a transmission wave and detect a target object based on a corresponding reflection wave.

BACKGROUND

Conventionally, it is known that a target detection device transmits a transmission wave and detects a target object based on a reflection wave corresponding to the transmission wave. In order to detect the position of the target object within a target angle range, this type of target detection device needs to identify an incoming direction of the reflection wave within the angle range. For example, a transmission array where a plurality of transmission elements are disposed at a pitch more than half of the wave length of the transmission wave can be used. By adjusting the pitch of the transmission elements, grating lobes are generated. The grating lobes are inclined by given angles relative to the front direction of the transmission array. By adjusting the pitch of the transmission elements, the transmitting directions of the grating lobes can be adjusted. Therefore, if the grating lobes are used as the transmission wave, the transmitting direction of the transmission wave can be specified by the pitch of the transmission elements, and therefore, the incoming direction of the reflection wave can be specified.

As a method of covering the target angle range by the grating lobes, there is a method in which a plurality of transmission arrays having the above configuration are disposed with different angular orientations. According to such a configuration, for example, two transmission beams with different transmitting directions are generated by each transmission array. Each transmission array is disposed so that a gap between the two transmission beams transmitted from one transmission array is filled with the transmission beams transmitted from another transmission array. Thus, each transmission array is associated with the transmitting direction within the target angle range. Therefore, the receiving direction of the reflection wave may be specified depending on which transmission array transmits.

However, since such target detection method or device uses the plurality of transmission arrays, the configuration of the target detection is complicated and, thus, it is high cost.

SUMMARY

Therefore, the present disclosure is made in view of this problem, and one purpose thereof is to provide a target detection device and a target detecting method, capable of detecting a target object with a simple configuration.

According to an aspect of the present disclosure, a target detection device is provided, which includes a transmission array and a signal generator. The transmission array includes a plurality of transmission elements configured to convert an electric signal into a transmission wave. The signal generator generates a plurality of sets of electric signals including a first set of electric signals and a second set of electric signals different from the first set, each set being generated with different phase settings. The signal generator is configured to group the plurality of transmission elements according to a plurality of grouping configurations including a first grouping configuration and a second grouping configuration, in the first grouping configuration, the plurality of transmission elements being grouped into a plurality of groups each having p transmission elements, and, in the second grouping configuration, the plurality of transmission elements being grouped into a plurality of groups each having q transmission elements, the q being different from the p. The signal generator inputs the first set of electric signals to each group of the first grouping configuration, and inputs the second set of electric signals to each group of the second grouping configuration.

The target detection device may further include a reception array including at least one reception element configured to receive a reflection wave resulting from a reflection of the transmission wave on a target object and convert the reflection wave into a reception signal. In this case, the target detection device may further include processing circuitry configured to process the reception signal. The processing circuitry may extract, based on a frequency component of the reception signal, an equal frequency reception signal of the reflection wave corresponding to the frequency component. In the target detection device, the reception array may include a plurality of reception elements. The processing circuitry may perform beamforming based on a reception signal generated from each of the reception elements, and calculate an incoming direction of the reflection wave from the target based on the beamforming.

According to another aspect of the present disclosure, a method of detecting a target by transmitting a transmission wave from a transmission array having a plurality of transmission elements configured to convert an electric signal into a transmission wave, is provided. The method includes grouping the plurality of transmission elements according to a plurality of grouping configurations including a first grouping configuration and a second grouping configuration. In the first grouping configuration, the plurality of transmission elements are grouped into a plurality of groups each having p transmission elements, and, in the second grouping configuration, the plurality of transmission elements are grouped into a plurality of groups each having q transmission elements, the q being different from the p. The method includes generating a plurality of sets of electric signals including a first set of electric signals and a second set of electric signals different from the first set, each set being generated with different phase settings, inputting the first set of electric signals to each group of the first grouping configuration, and inputting the second set of electric signals to each group of the second grouping configuration.

According to this configuration, the grating lobe transmitted from the transmission elements grouped conforming to the first grouping configuration, and the grating lobe transmitted from the transmission elements grouped conforming to the second grouping configuration can be differentiated in the transmitting direction. Therefore, a plurality of the transmission beams (grating lobes) with different transmitting directions can be transmitted by the single transmission array. Therefore, the target object can be smoothly detected by the simple configuration.

The effects and the significance of the present disclosure will be clear from the embodiment described below. Note that the embodiment described below is to be interpreted only as illustration to implement the present disclosure, and not to limit the present disclosure.

BRIEF DESCRIPTION OF DRAWINGS

The present disclosure is illustrated by way of example and not by way of limitation in the figures of the accompanying drawings, in which like reference numerals indicate like elements and in which:

FIG. 12A is a functional block diagram illustrating an example configuration of a reception signal processing module according to this embodiment;

FIG. 12B is a functional block diagram illustrating another example configuration of the reception signal processing module according to this embodiment;

DETAILED DESCRIPTION

Hereinafter, one embodiment of the present disclosure is described with reference to the accompanying drawings.

Basic Configuration

First, a basic configuration of a transmission-and-reception system of a target detection device according to this embodiment is described.

Figure 1:
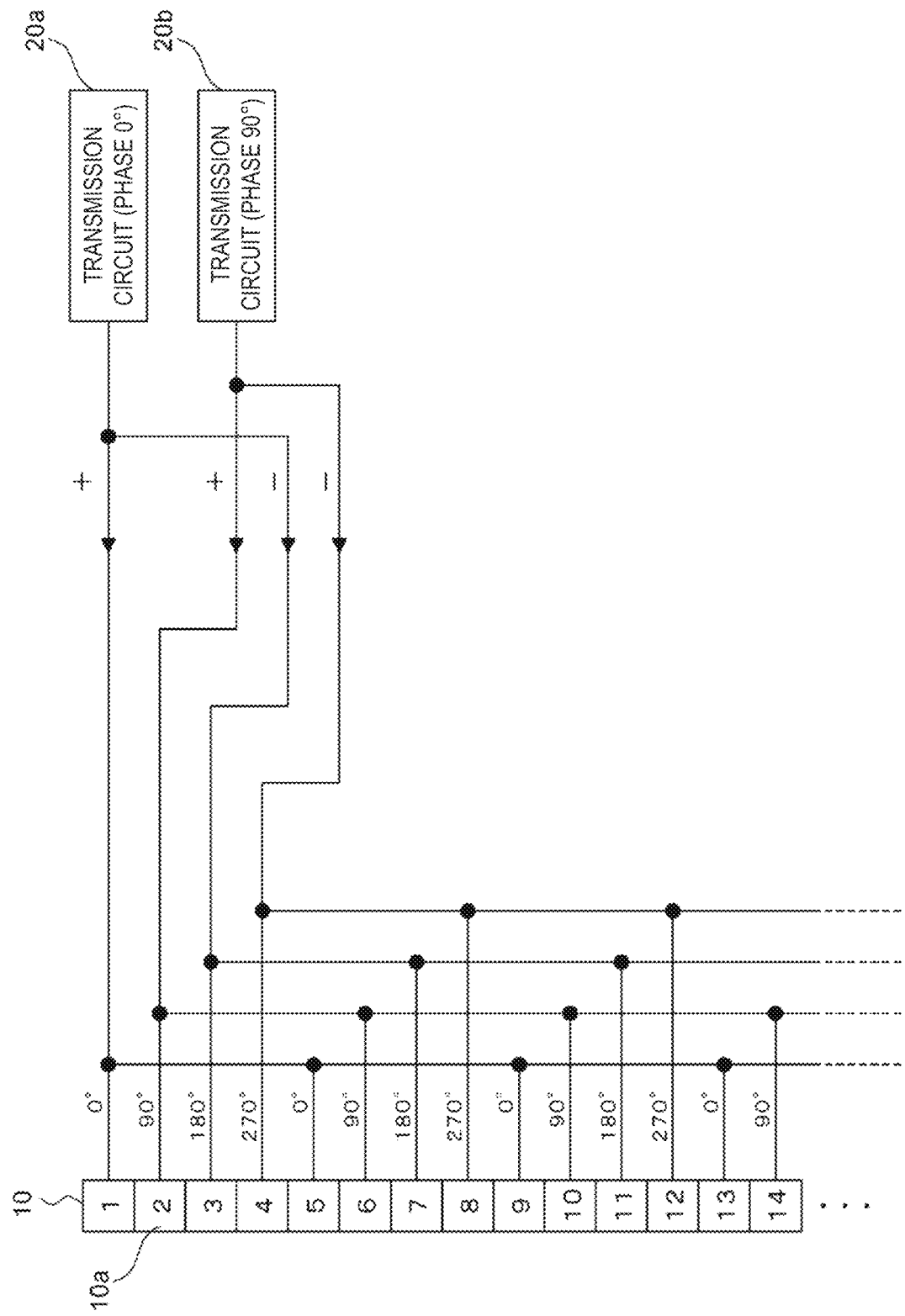
FIG. 1 is a view illustrating a configuration of a transmission system according to a reference example.

FIG. 1 is a view illustrating a configuration of a transmission system according to a reference example.

According to the configuration of FIG. 1, a transmission array 10 in which a plurality of transmission elements 10a are lined up in a single line is used. Here, although fourteen transmission elements 10a are illustrated for convenience, the number of transmission elements 10a is not limited to this number. In FIG. 1, the number is given for convenience to each transmission element 10a in an order from the top.

In this example configuration, four adjacent transmission elements 10a may be considered to be one set, and sine-wave electric signals are supplied from transmission circuits 20a and 20b to each set. Therefore, the four transmission elements 10a included in one set may function as one transmission area. A pitch between the sets may be more than half of the wave length of the electric signals outputted from the transmission circuits 20a and 20b. Therefore, the pitch of the transmission area may be more than half of the wave length of the electric signals. Thus, by setting the pitch of the transmission area (the pitch of each set) more than half of the wave length of the electric signals, a grating lobe can be transmitted from the transmission array 10.

The transmission circuits 20a and 20b each may output the sine-wave electric signal. The transmission circuits 20a and 20b may output the electric signals at the same frequency. The electric signal outputted from the transmission circuit 20b may be advanced by 90° in the phase from the electric signal outputted from the transmission circuit 20a.

The electric signal may be supplied from the transmission circuit 20a to the first and third transmission elements 10a among the four transmission elements 10a included in one set, and the electric signal may be supplied from the transmission circuit 20b to the second and fourth transmission elements 10a. The electric signals supplied from the transmission circuits 20a and 20b to the third and fourth transmission elements 10a may be inverted in the phase. The phase inversion is performed, for example, by inverting the polarities of the connections of the signal wires from the transmission circuits 20a and 20b relative to the transmission elements 10a. Note that a phase adjusting circuit for inverting the phase may be provided.

Thus, by supplying the electric signal to each transmission element 10a, the electric signals may be supplied to each set of four transmission elements 10a with the phase being shifted by 90° from each other. Therefore, the transmission waves may be outputted from the transmission array 10 so that the main lobe is eliminated and only one grating lobe appears on one side. In addition, by changing the frequency of the electric signals outputted from the transmission circuits 20a and 20b, the direction of the grating lobe can be changed to the arrayed direction of the transmission elements 10a. Therefore, an angle between the front direction of the transmission array 10 and the direction of the transmission waves can be changed so that the transmission wave can scan in the direction of this angle.

In this way, the transmitting direction of the transmission waves may be associated with the frequency of the electric signals. Therefore, the transmitting direction of the transmission wave can be identified based on the frequency of the reception signal generated by reception by a receiver of a reflection wave corresponding to the transmission wave. That is, a direction of a target object which caused the reflection wave may be identified with the frequency of the reception signal.

Note that, although in the above, the phase shift between the transmission elements 10a is set as 90°, the phase shift is not limited to this angle. For example, even if the phase shift between the transmission elements 10a is set as 60° or 45°, the main lobe can still be eliminated and only one grating lobe still appears on one side. For example, if the phase shift is set as 60°, six transmission elements 10a may be considered to be one set, and the electric signals at the phases of 0°, 60°, 120°, 180°, 240°, and 300° may be supplied to the six transmission elements 10a of each set. Moreover, if the phase shift is set as 45°, eight transmission elements 10a may be considered to be one set, and the electric signals at the phases of 0°, 45°, 90°, 135°, 180°, 225°, 270°, and 315° may be supplied to the eight transmission elements 10a of each set. Also in these cases, by changing the frequency of the electric signal, the direction of the grating lobe can be changed to the arrayed direction of the transmission elements 10a, and therefore the transmitting direction of the transmission wave can be changed.

Since only one grating lobe scans in the configuration of FIG. 1, a scan range of the transmission wave may be narrow. Therefore, in this embodiment, by supplying a plurality of sets of electric signals with different phase shifts to the plurality of transmission elements 10a, a plurality of grating lobes with different directions may be produced. In addition, by changing the frequency of the electric signals of each set, the transmitting direction may be changed for each grating lobe to allow the grating lobe to scan. Thereby, the entire scan range can be expanded.

Figure 2:
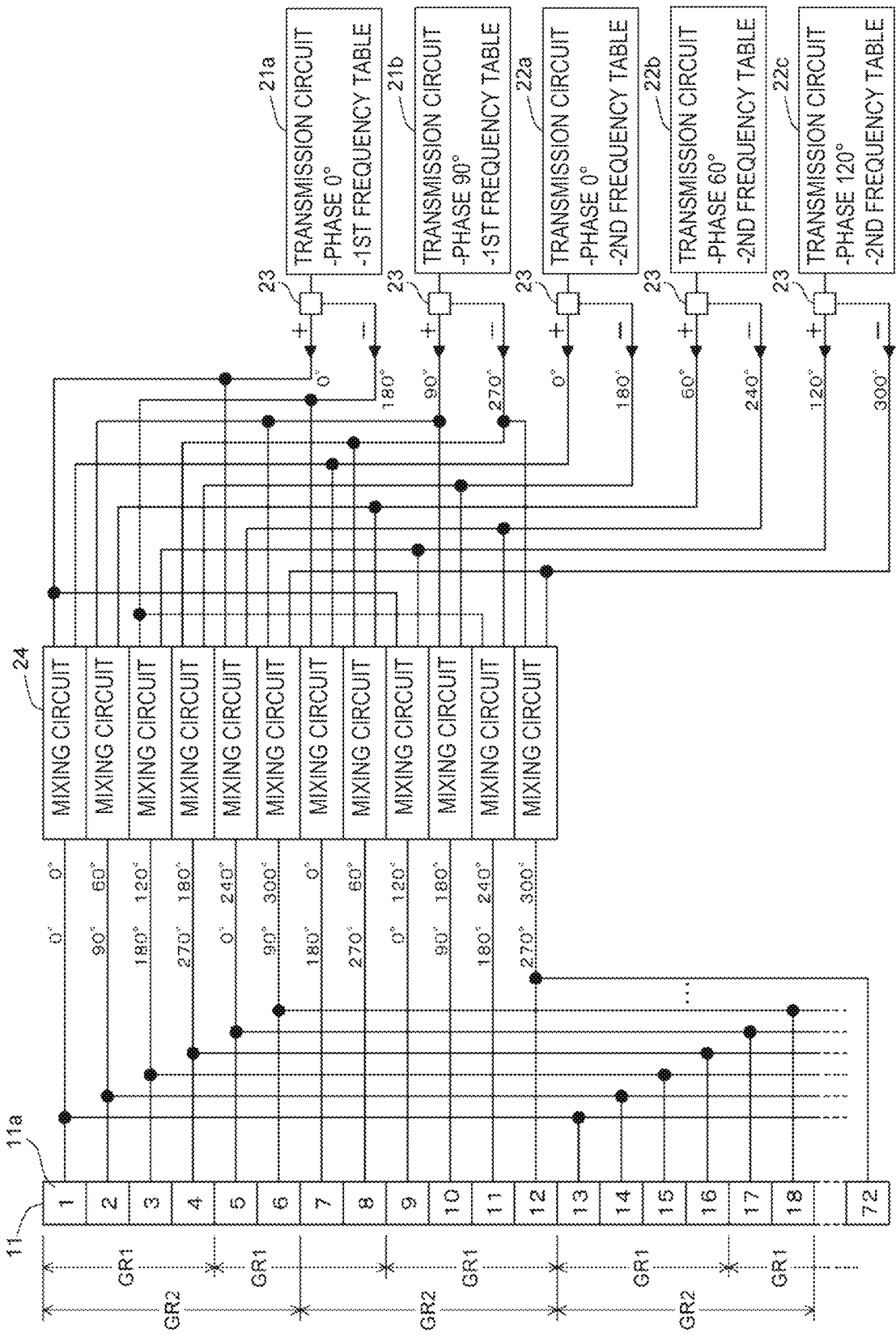
FIG. 2 is a view illustrating a configuration of a transmission system according to one embodiment.

FIG. 2 is a view illustrating a configuration of a transmission system according to this embodiment. Note that examples of a plurality of angles in FIG. 2 illustrates phases of the electric signals supplied through the signal wires, when the phase of the electric signal (sine wave) outputted from a transmission circuit 21a is 0°.

In the example configuration of FIG. 2, a transmission array 11 in which 72 transmission elements 11a are lined up in a single line at equal interval is used. Note that the number of transmission elements 11a is not limited to 72. In FIG. 2, for convenience, the number is given to each transmission element 11a in an order from the top.

The 72 transmission elements 11a may be grouped conforming to a first grouping configuration and a second grouping configuration. In the first grouping configuration, the 72 transmission elements 11a may be grouped into a plurality of groups GR1 each having four transmission elements 11a. Moreover, in the second grouping configuration, the 72 transmission elements 11a may be grouped into a plurality of groups GR2 each having six transmission elements 11a. Therefore, the 72 transmission elements 11a used for the first grouping configuration may be the same as the 72 transmission elements 11a used for the second grouping configuration. That is, the common transmission elements 11a may be used for the first grouping configuration and the second grouping configuration.

Then, a first set of electric signals in which the phase shift is carried out by 90° may be inputted to each group GR1 of the first grouping configuration, and a second set of electric signals in which the phase shift is carried out by 60° may be inputted to each group GR2 of the second grouping configuration. That is, the plurality of electric signals included in the first group may have the equal phase shift between the electric signals (90° phase shift), and the plurality of electric signals included in the second group may have the equal phase shift between the electric signals (60° phase shift).

The electric signals outputted from transmission circuits 21a and 21b may be supplied to the transmission elements 11a of the group GR1. A pitch of the group GR1 may be more than half of the wave length of the electric signals outputted from the transmission circuits 21a and 21b. The transmission circuits 21a and 21b may output the sine-wave electric signal with the 90° phase shift, similar to the transmission circuits 20a and 20b of FIG. 1. The electric signals outputted from the transmission circuits 21a and 21b may be converted into two routes of electric signals by a phase adjusting circuit 23. The electric signal of the first route with "+" in FIG. 2 among the electric signals of the two routes may be an electric signal at the same phase as the electric signals outputted from the transmission circuits 21a and 21b, and the electric signal of the second route with "−" may be an electric signal at the inverted phase of the electric signals outputted from the transmission circuits 21a and 21b. The electric signal of each route may be inputted into a corresponding mixing circuit 24.

The electric signals outputted from transmission circuits 22a-22c may be supplied to the transmission elements 11a of the group GR2. A pitch of the group GR2 may be more than half of the wave length of the electric signals outputted from the transmission circuits 22a-22c. The transmission circuits 22a-22c may output the sine-wave electric signals with 60° phase shift. The electric signals outputted from the transmission circuits 22a-22c may be converted into two routes of electric signals by the phase adjusting circuit 23 similarly to the above. The electric signal of the first route with "+" in FIG. 2 among the electric signals of the two routes may be an electric signal at the same phase as the electric signals outputted from the transmission circuits 22a-22c, and the electric signal of the second route with "−" may be an electric signal at the inverted phase of the electric signals outputted from the transmission circuits 22a-22c. The electric signal of each route may be inputted into the corresponding mixing circuit 24.

Figures 3A, 3B:
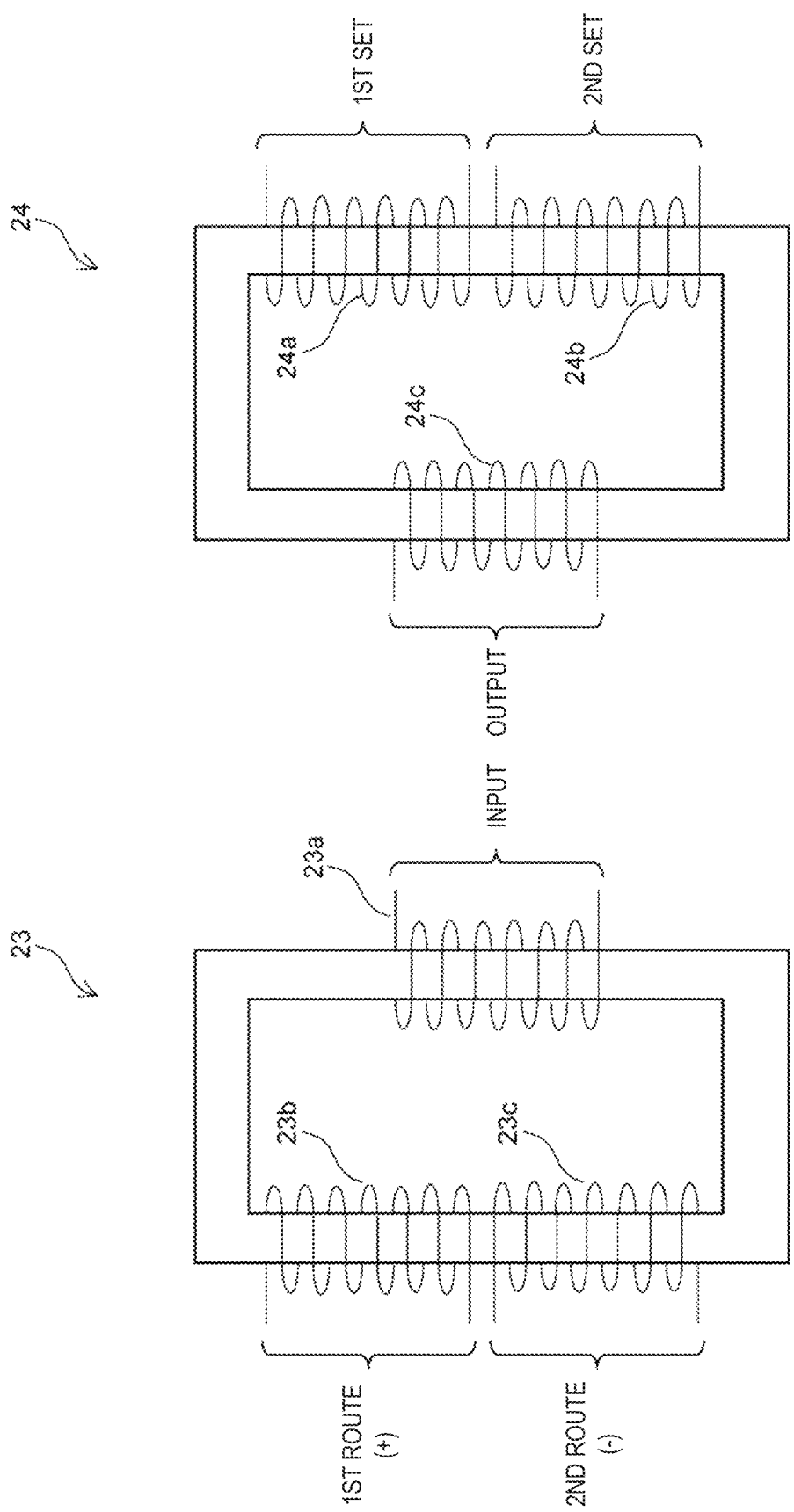
FIG. 3A is a view illustrating a configuration of a phase adjusting circuit according to this embodiment.
FIG. 3B is a view illustrating a configuration of a mixing circuit according to this embodiment.
Figure 4A:
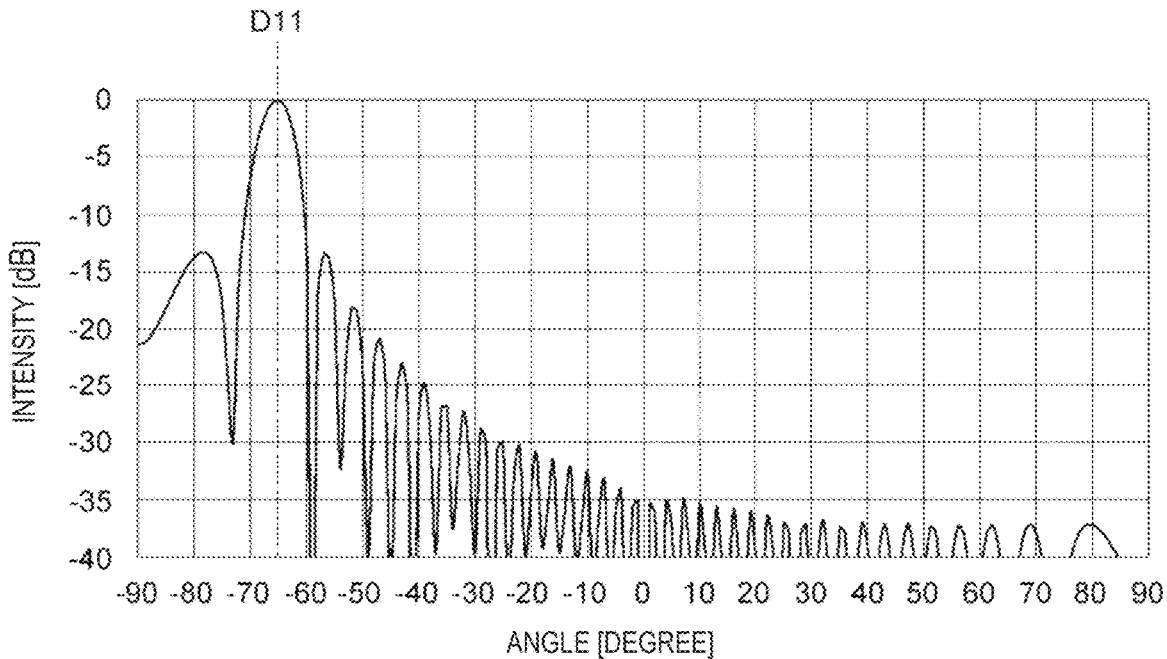
FIG. 4A is a simulation result of an appearing mode of a grating lobe when applying a first set of electric signals to each group of transmission elements conforming to a first grouping configuration according to this embodiment.
Figure 4B:
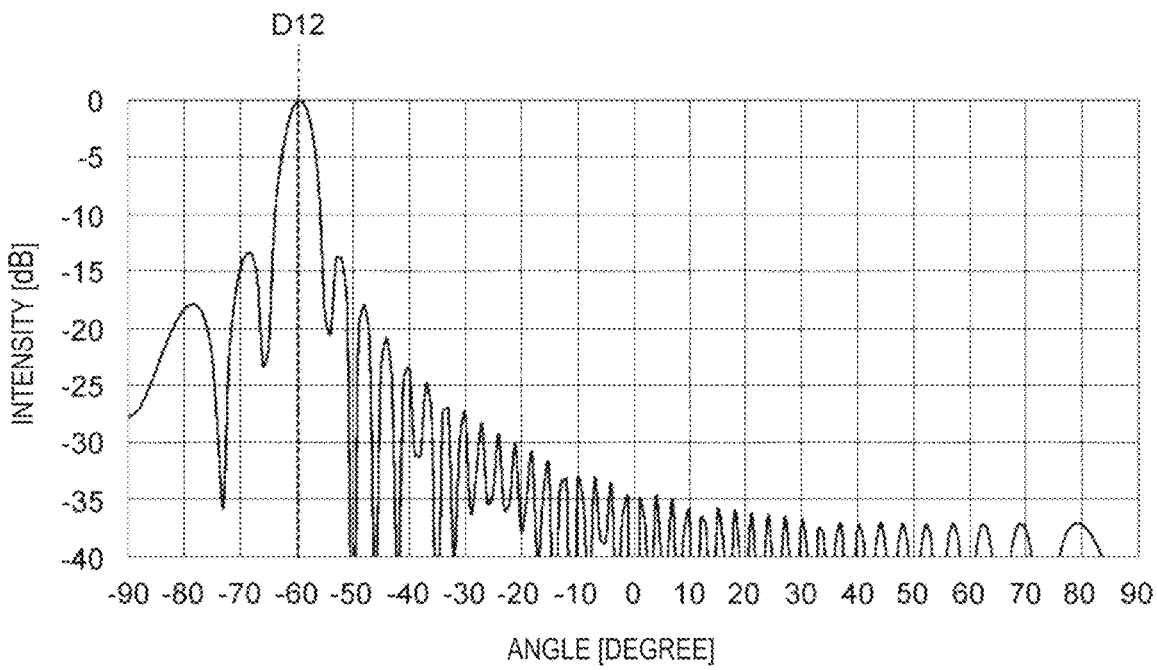
FIG. 4B is a simulation result of the appearing mode of the grating lobe when applying the first set of electric signals to each group of transmission elements conforming to the first grouping configuration according to this embodiment.
Figure 5A:
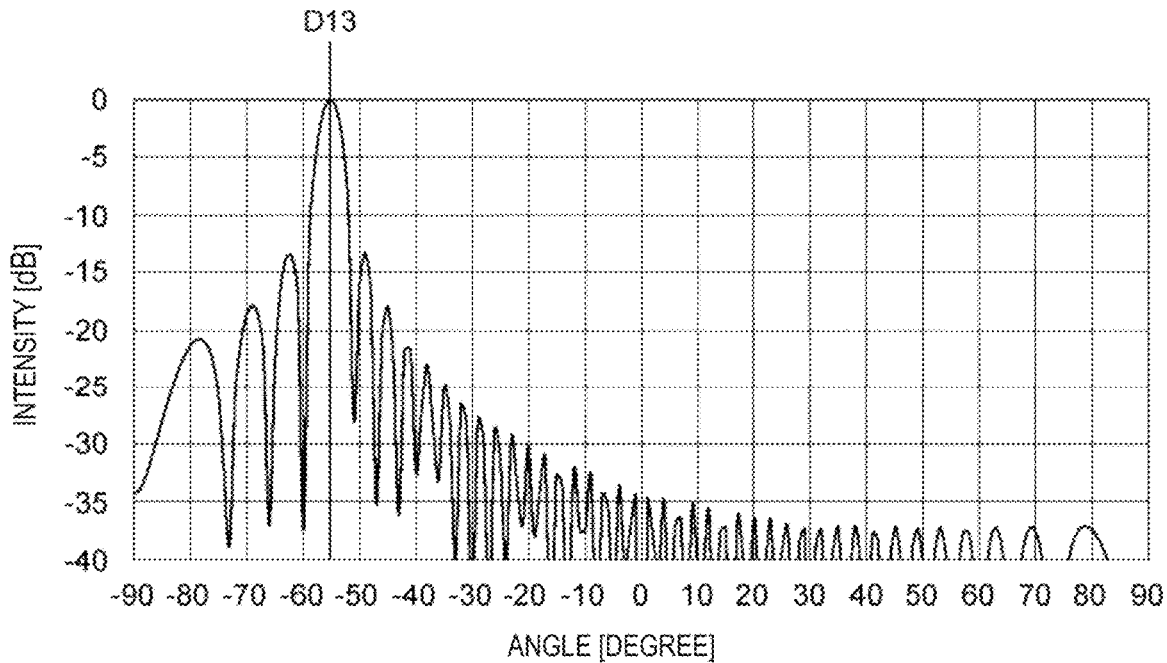
FIG. 5A is a simulation result of the appearing mode of the grating lobe when applying the first set of electric signals to each group of transmission elements conforming to the first grouping configuration according to this embodiment.
Figure 5B:
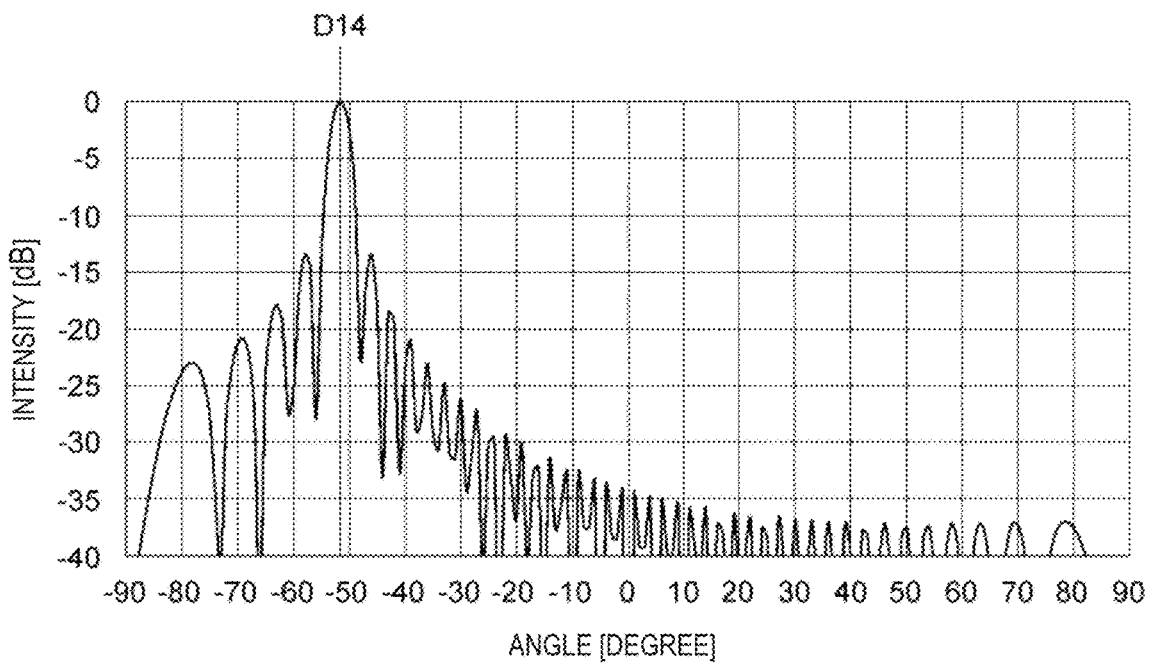
FIG. 5B is a simulation result of the appearing mode of the grating lobe when applying the first set of electric signals to each group of transmission elements conforming to the first grouping configuration according to this embodiment.
Figure 6A:
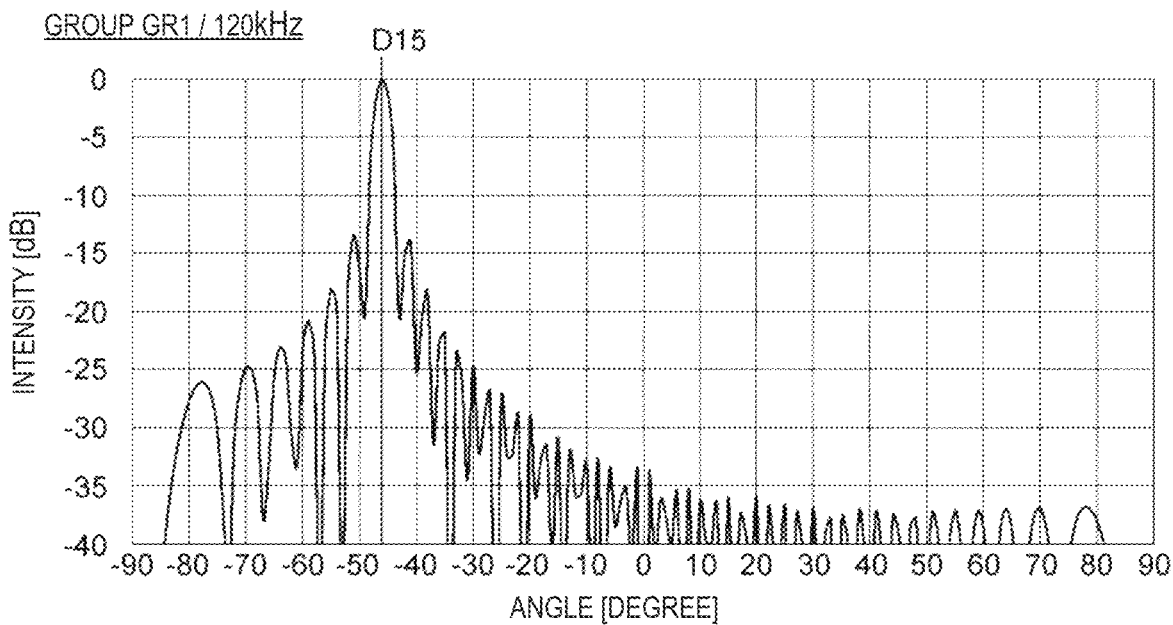
FIG. 6A is a simulation result of the appearing mode of the grating lobe when applying the first set of electric signals to each group of transmission elements conforming to the first grouping configuration according to this embodiment.
Figure 6B:
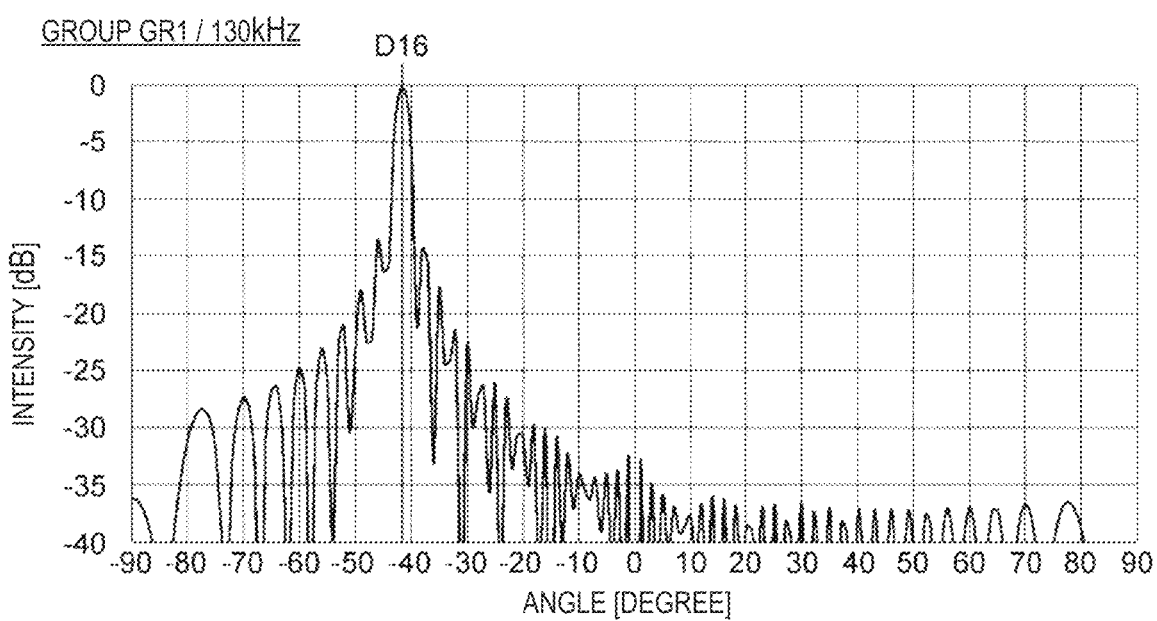
FIG. 6B is a simulation result of the appearing mode of the grating lobe when applying the first set of electric signals to each group of transmission elements conforming to the first grouping configuration according to the embodiment.
Figure 6C:
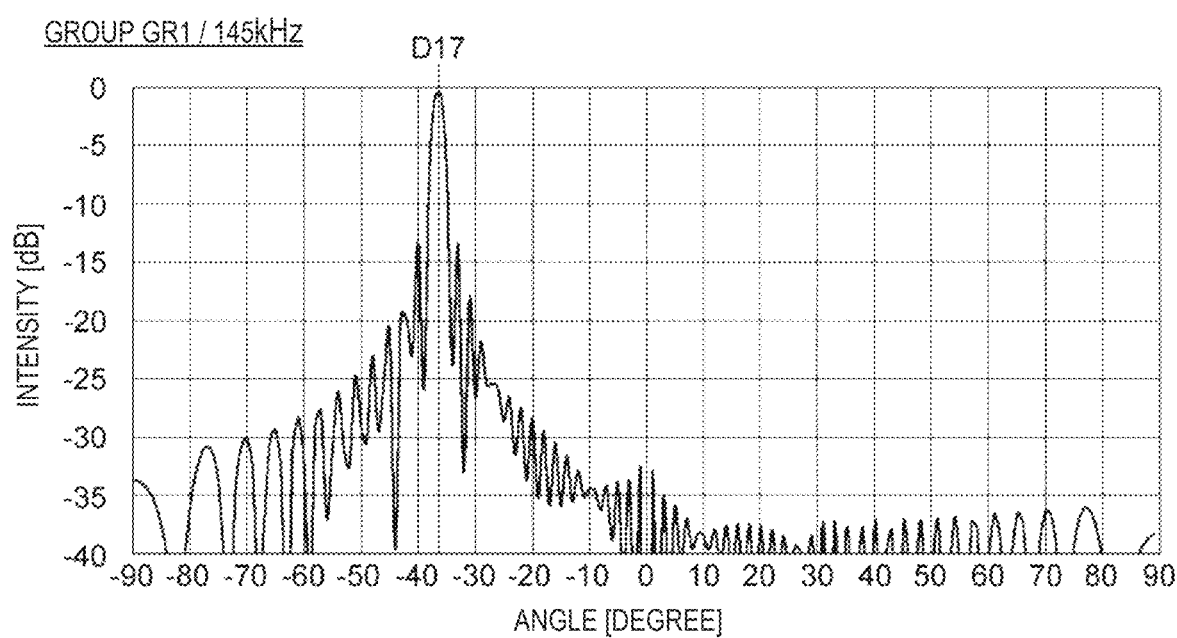
FIG. 6C is a simulation result of the appearing mode of the grating lobe when applying the first set of electric signals to each group of transmission elements conforming to the first grouping configuration according to this embodiment.
Figure 7A:
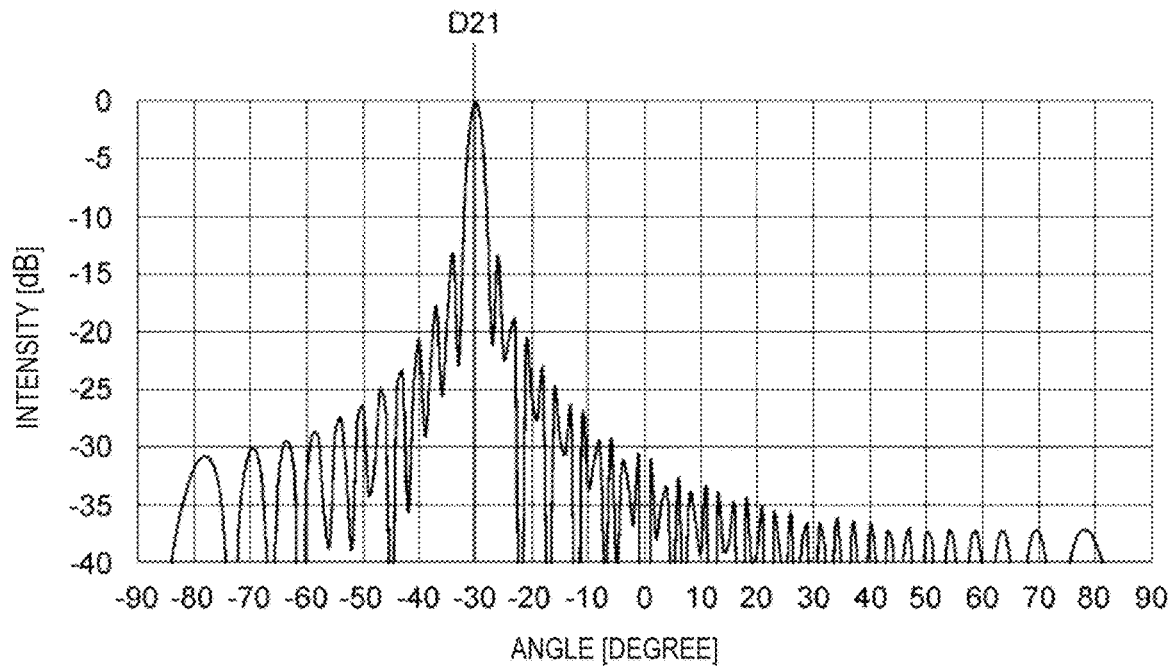
FIG. 7A is a simulation result of the appearing mode of the grating lobe when applying a second set of electric signals to each group of transmission elements according to a second grouping configuration according to this embodiment.
Figure 7B:
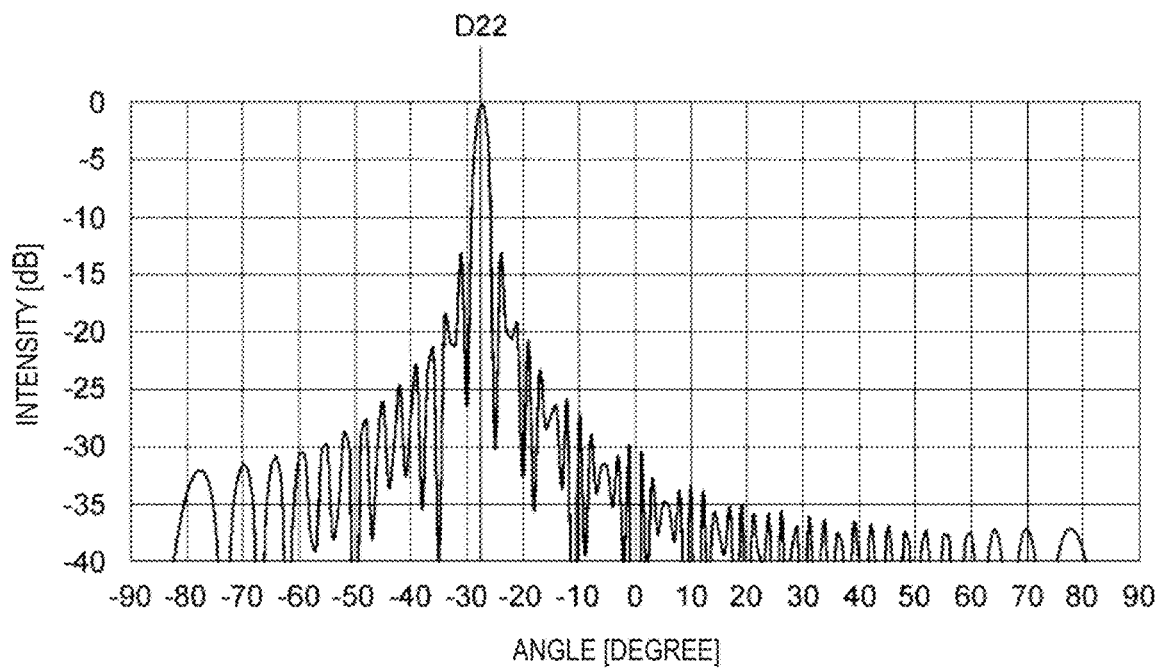
FIG. 7B is a simulation result of the appearing mode of the grating lobe when applying the second set of electric signals to each group of transmission elements conforming to the second grouping configuration according to this embodiment.
Figure 8A:
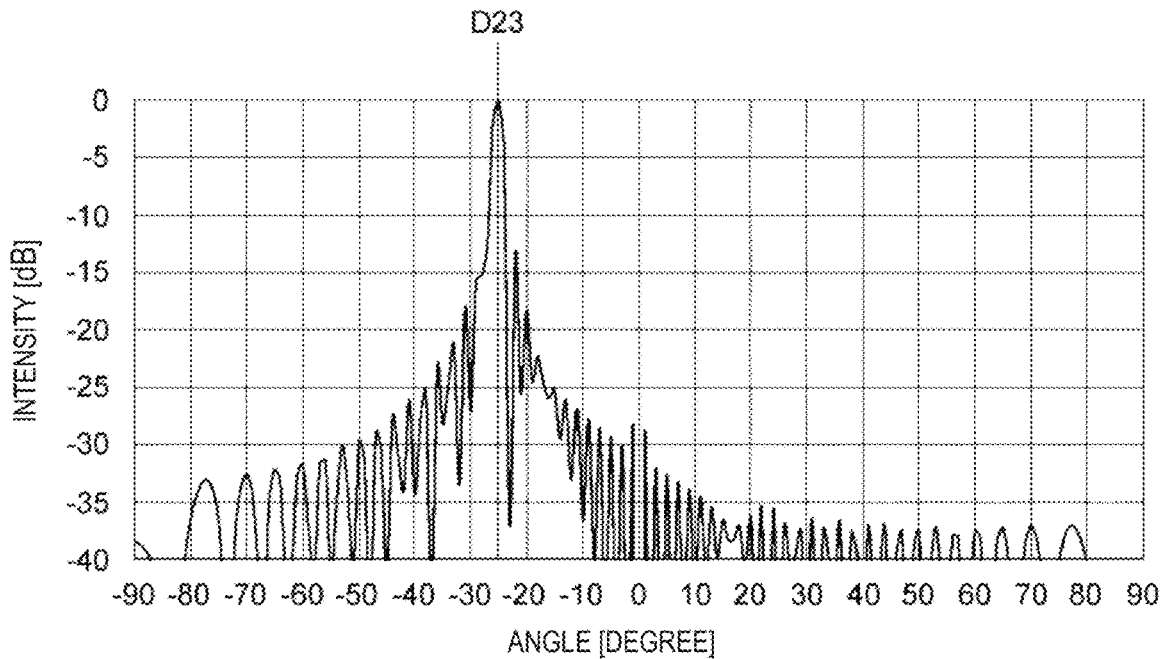
FIG. 8A is a simulation result of the appearing mode of the grating lobe when applying the second set of electric signals to each group of transmission elements conforming to the second grouping configuration according to this embodiment.
Figure 8B:
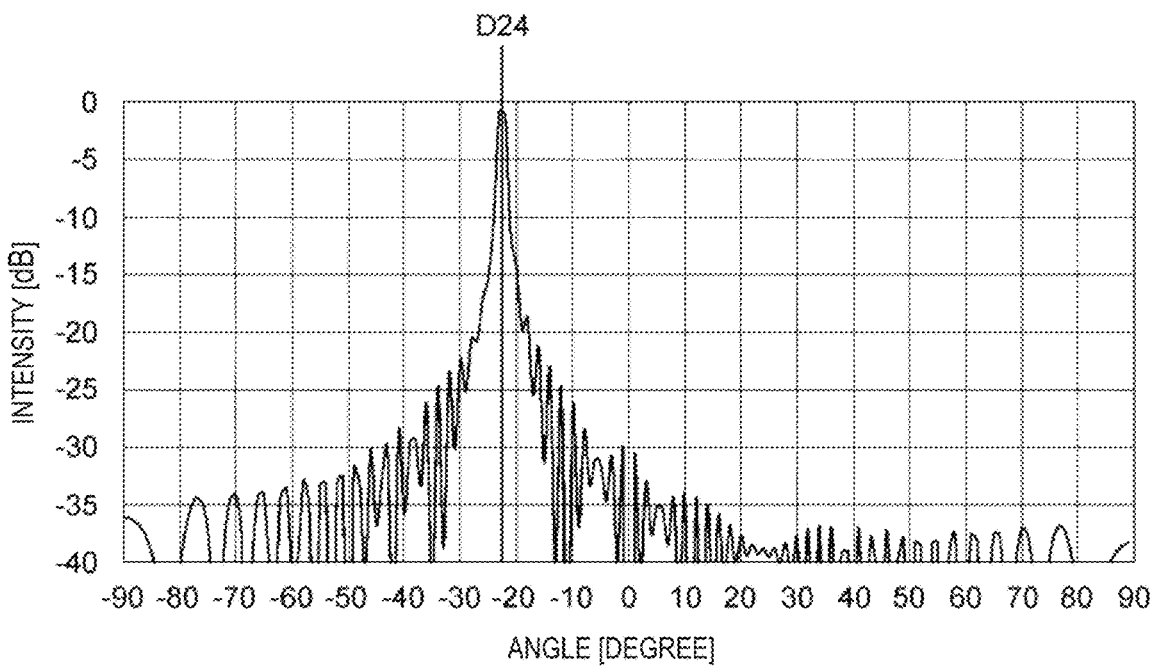
FIG. 8B is a simulation result of the appearing mode of the grating lobe when applying the second set of electric signals to each group of transmission elements conforming to the second grouping configuration according to this embodiment.

FIG. 3A is a view illustrating a configuration of the phase adjusting circuit 23.

The phase adjusting circuit 23 may be comprised of a transformer where one coil 23a is disposed at the input side and two coils 23b and 23c are disposed at the output side. The two coils 23b and 23c at the output side may be mutually reversed in the winding direction. The electric signal outputted from any of the transmission circuits 21a, 21b, and 22a-22c may be inputted into the coil 23a at the input side. The electric signal at the same phase as the inputted electric signal may be outputted from one coil 23b at the output side by electromagnetic induction. This electric signal may be the electric signal of the first route.

The other coil 23c at the output side may be reversed in the winding direction from one coil 23b. Therefore, from the other coil 23c, the electric signal at the inverted phase of the electric signal inputted into the coil 23a may be outputted. This electric signal may be the electric signal of the second route. In this way, the two routes of electric signals with the mutually inverted phases may be outputted from the phase adjusting circuit 23.

The phase adjusting circuit 23 is not limited to have the configuration of FIG. 3A, and may have other configurations as long as it can generate the two routes of the electric signals comprised of the electric signal at the same phase as the electric signals outputted from the transmission circuits 21a, 21b, and 22a-22c, and the electric signal at the inverted phase.

Returning to FIG. 2, the frequencies of the electric signals outputted from the transmission circuits 21a and 21b may be mutually the same. The transmission circuits 21a and 21b may switch the frequency of the electric signal according to a first frequency table. For example, frequencies of 95, 100, 105, 110, 120, 130, and 145 kHz are assigned to the first frequency table. The transmission circuits 21a and 21b may cyclically switch the frequency of the electric signal in the order of the frequencies assigned to the first frequency table.

Moreover, the frequencies of the electric signals outputted from the transmission circuits 22a-22c may be mutually the same. The transmission circuits 22a-22c may switch the frequency of the electric signal according to a second frequency table. The frequencies assigned to the second frequency table may be different from the frequencies assigned to the first frequency table. For example, frequencies of 115, 125, 135, and 150 kHz are assigned to the second frequency table. The transmission circuits 22a-22c may cyclically switch the frequency of the electric signal in the order of the frequencies assigned to the second frequency table.

FIG. 3B is a view illustrating a configuration of the mixing circuit 24.

The mixing circuit 24 may be comprised of a transformer where two coils 24a and 24b are disposed at the input side and one coil 24c is disposed at the output side. The two coils 24a and 24b at the input side may be the same in the winding direction. The electric signals of the first set and the second set may be inputted to the two coils 24a and 24b from the corresponding phase adjusting circuit 23. The electric signals inputted into the coils 24a and 24b at the input side may be mixed with each other by electromagnetic induction, and may be outputted from the coil 24c at the output side. The outputted electric signal may include each frequency component of the two inputted electric signals.

Note that, although in the configuration of FIG. 2 the phases of the electric signals outputted from the transmission circuits 21a, 21b, and 22a-22c are inverted by the phase adjusting circuit 23, the phases of the electric signals may be inverted by connecting the transmission circuits 21a, 21b, and 22a-22c with the coils 24a and 24b so that currents flowing through the coils 24a and 24b normally become in the opposite direction to each other. That is, the output lines of the transmission circuits 21a, 21b, and 22a-22c may be branched into two routes, one of the output lines may be connected to one of the coils 24a and 24b in the normal connecting form, and the other output line may be connected to the other coil in the form where current flows in the direction opposite from the normal connecting form. In this case, the phase adjusting circuit 23 may be omitted.

The mixing circuit 24 is not limited to have the configuration of FIG. 3B, and it may have other configurations, as long as the two routes of electric signals are mixed on each other so that the frequency components of the two electric signals are included.

Returning to FIG. 2, the number of mixing circuits 24 (here, twelve) may be the least common multiple of the number of transmission elements 11a included in the group GR1 (here, four) and the number of transmission elements 11a included in the group GR2 (here, six). The electric signals outputted from the twelve mixing circuits 24 may be inputted into twelve transmission elements 11a which are continuously lined up, respectively. In FIG. 2, the electric signals outputted from the twelve mixing circuits 24 may be inputted into the 1st to 12th transmission elements 11a, the 13th to 24th transmission elements 11a, the 25th to 36th transmission elements 11a, the 37th to 48th transmission elements 11a, the 49th to 60th transmission elements 11a, and the 61th to 72nd transmission elements 11a.

Here, different frequencies may be applied to the first set of electric signals inputted into the transmission elements 11a of the group GR1 (i.e., the electric signals with the 90° phase shift outputted from the transmission circuits 21a and 21b) and the second set of electric signals inputted into the transmission elements 11a of the group GR2 (i.e., the electric signals with the 60° phase shift outputted from the transmission circuits 22a-22c) based on the first frequency table and the second frequency table. Therefore, even if these electric signals are mixed and inputted into the transmission elements 11a, the grating lobe may be individually formed by the electric signals of each set.

Therefore, by inputting the electric signals into the 72 transmission elements 11a as described above, the grating lobe based on the first set of electric signals with the 90° phase shift may be formed based on the transmission elements 11a of the group GR1, and the grating lobe based on the second set of electric signals with the 60° phase shift may be formed based on the transmission elements 11a of the group GR2. Then, by changing the frequency of the electric signals of each set according to the corresponding frequency table, each grating lobe can be allowed to scan in the arrayed direction of the transmission elements 11a.

FIGS. 4A to 8B are graphs, each illustrating a simulation result of the direction in which the grating lobe occurs calculated by simulation. In FIGS. 4A to 8B, the horizontal axis is an angle with the front direction of the transmission array 11, and the vertical axis is an intensity of the transmission wave transmitted from the transmission array 11. The arrayed direction of the transmission elements 11a may be ±90° in the horizontal axis.

In this simulation, the pitch of the transmission elements 11a may be set as 4.35 mm. The number of transmission elements 11a may be set as 72, similarly to the above.

Moreover, the first set and the second set of electric signals may be changed to the respective frequencies assigned to the first frequency table and the second frequency table. Moreover, the phase of the electric signal applied to each transmission element 11a may be set similar to FIG. 2.

FIGS. 4A to 6C are simulation results when applying the first set of electric signals at the frequencies of 95, 100, 105, 110, 120, 130, and 145 kHz to the transmission elements 11a of the group GR1. Moreover, FIGS. 7A to 8B are simulation results when applying the second set of electric signals at the frequencies of 115, 125, 135, and 150 kHz to the transmission elements 11a of the group GR2.

As illustrated in FIGS. 4A to 6C, when the electric signals at the frequencies of 95, 100, 105, 110, 120, 130, and 145 kHz are applied to the transmission elements 11a of the group GR1, the grating lobe may occur near different angles D11, D12, D13, D14, D15, D16, and D17. The six grating lobes may cover a range of −65° to −35° in general. Therefore, by changing the frequency of the electric signals applied to the transmission elements 11a of the group GR1 as described above, the grating lobe occurring from the transmission elements 11a of the group GR1 can be allowed to scan the range of −65° to −35°.

Moreover, as illustrated in FIGS. 7A to 8B, when the electric signals at the frequencies of 115, 125, 135, and 150 kHz are applied to the transmission elements 11a of the group GR2, the grating lobe may occur near different angles D21, D22, D23, and D24. The four grating lobes may cover the range of −30° to −23° in general. Therefore, by changing the frequency of the electric signals applied to the transmission elements 11a of the group GR2 as described above, the grating lobe occurring from the transmission elements 11a of the group GR2 can be allowed to scan the range of −30° to −23°.

As described above, under the simulation condition described above, the grating lobe formed by the transmission elements 11a of the group GR1 can cover the angle range of about 30° (−65° to −35°), the grating lobe formed by the transmission elements 11a of the group GR2 can cover the angle range of about 7° (−30° to −23°). Therefore, adding up the angle ranges of the groups GR1 and GR2, the two grating lobes can cover the angle range of about 42° (−65° to −23°). That is, an angle of visibility of 42° can be realized.

Figure 9:
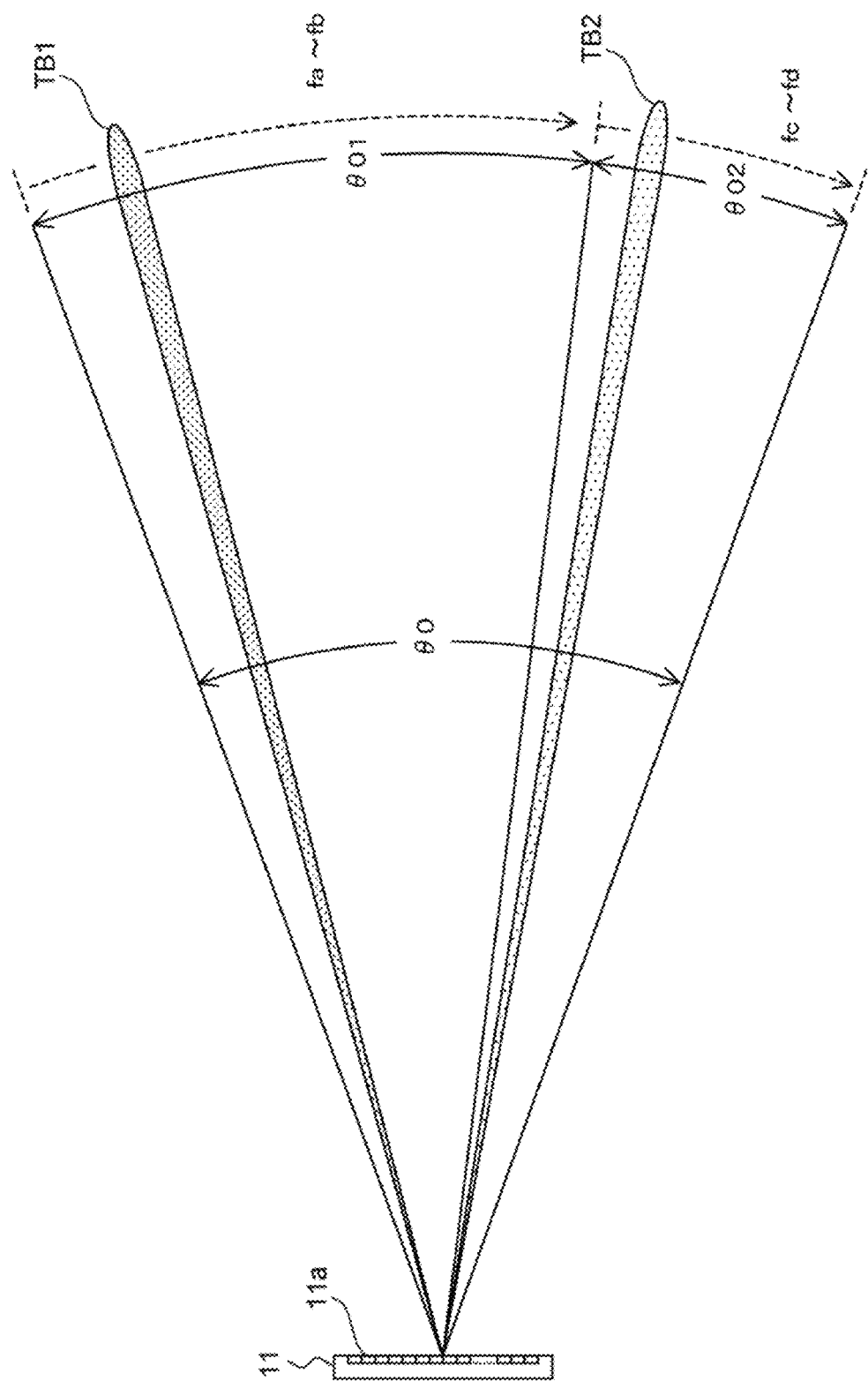
FIG. 9 is a view schematically illustrating a transmission mode of two transmission beams according to this embodiment.

FIG. 9 is a view schematically illustrating a range covered by a transmission beam.

In FIG. 9, a transmission beam TB1 may correspond to the grating lobe formed by the transmission elements 11a of the group GR1, and a transmission beam TB2 may correspond to the grating lobe formed by the transmission elements 11a of the group GR2. By changing the frequency of the first set of electric signals supplied to the transmission elements 11a of the group GR1 within a range of fa to fb, the transmission beam TB1 may scan within a range of an angle θ01. Moreover, by changing the frequency of the second set of electric signals supplied to the transmission elements 11a of the group GR2 within a range of fc to fd, the transmission beam TB2 may scan within a range of an angle θ02. Therefore, the transmission beams TB1 and TB2 can scan the total range (an angle θ0) of the angle θ01 and the angle θ02.

In the above simulation, the varying range (fa-fb) of the frequency of the first set of electric signals and the varying range (fc-fd) of the frequency of the second set of electric signals are 95 to 145 kHz and 115 to 150 kHz, respectively, the angles θ01 and θ02 are 30° and 7°, respectively, and the angle θ0 is 42°.

Note that although in the above configuration and simulation of FIG. 2 the phase shift of the first set of electric signals is set as 90° and the phase shift of the second set of electric signals is set as 60°, the phase shift of the second set of electric signals may be set as 45°. In this case, the number of transmission elements 11a included in the group GR2 may be changed according to the change in the number of combinations of the electric signals accompanying the change in the phase shift.

Alternatively, the phase shift of the first set of electric signals may be set as 45°. Also in this case, the number of transmission elements 11a included in the group GR1 is changed according to the change in the number of combinations of the electric signals accompanying the change in the phase shift.

Moreover, the change in the frequencies of the first set and the second set of electric signals is not limited to the above example, and the frequencies may suitably be changed according to the ranges of the angles θ01 and θ02.

Figure 10:
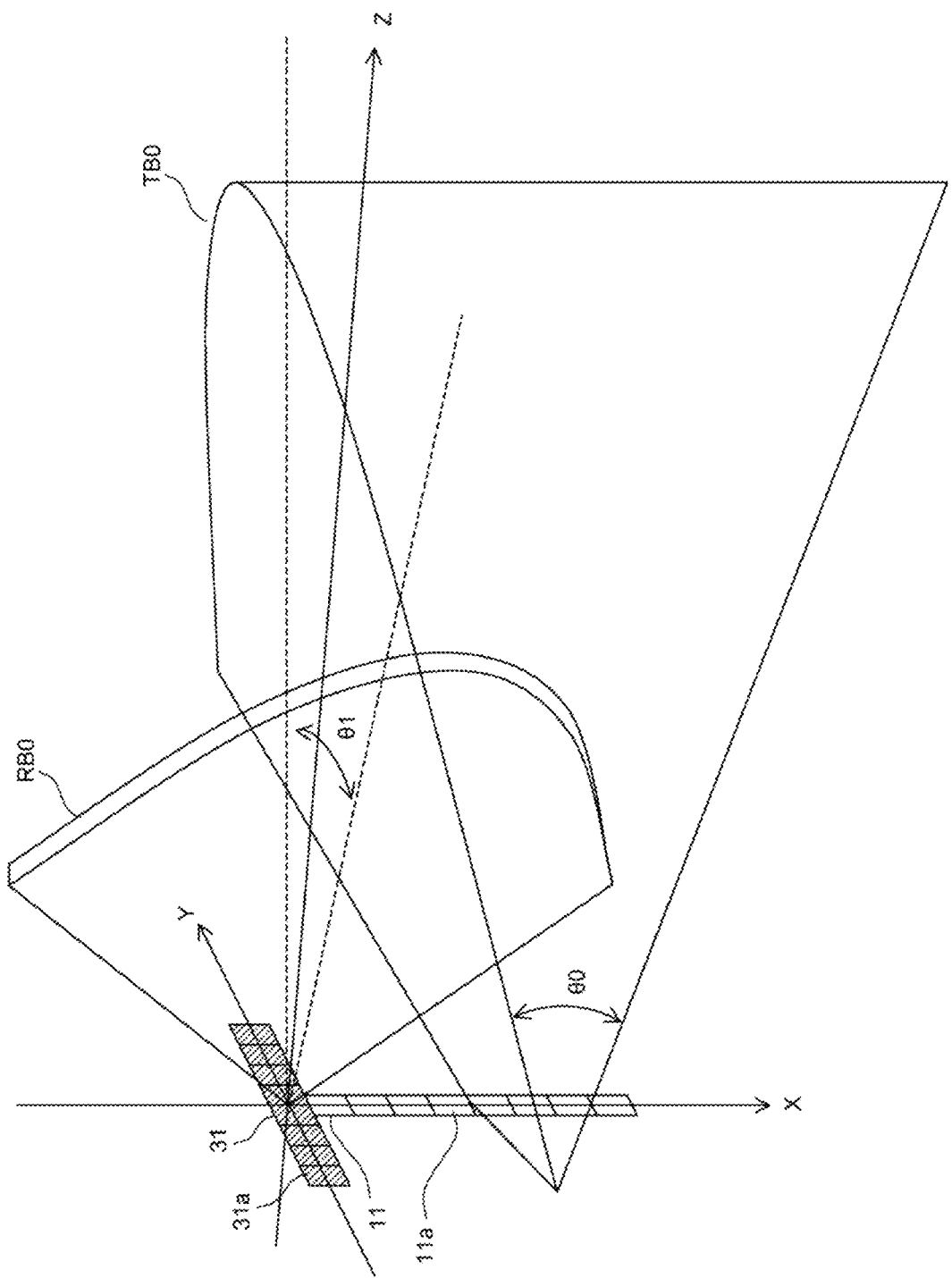
FIG. 10 is a view schematically illustrating an example configuration of a transmission-and-reception system according to this embodiment.

FIG. 10 is a view schematically illustrating an example configuration of the transmission-and-reception system.

In this example configuration, a reception array 31 having a plurality of reception elements 31a may be provided as a reception system, in addition to the configuration of the transmission system illustrated in FIG. 2. The transmission system may be provided with the transmission array 11, similar to FIG. 2. The transmission array 11 may be disposed along the X-axis. The reception array 31 may be disposed immediately above the transmission array 11. In this example configuration, the arrayed direction of the reception elements 31a may be perpendicular to the arrayed direction of the transmission elements 11a.

By driving the transmission elements 11a in the transmission array 11 by the method illustrated with reference to FIG. 2, a transmission beam TB0 may be formed forward of the transmission array 11 (positive in the Z-axis). Here, the total range of the scan ranges of the transmission beams TB1 and TB2 illustrated in FIG. 9 is illustrated as a scan range of the transmission beam TB0.

By performing a phase control (beamforming) to the reception signal outputted from each reception element 31a, a narrow reception beam RB0 may be formed in the circumferential direction centering on the X-axis. Thus, the reception signals in an area where the reception beam RB0 and the transmission beam TB0 cross may be extracted. According to the phase control, by turning the reception beam RB0 in a θ1 direction centering on the X-axis, the reception signal at each turning position may be extracted.

The turning position of the reception beam RB0 may define an incoming direction of the reflection wave in the horizontal direction (θ1 direction), of which the transmission wave is reflected on a target object. Moreover, as described with reference to FIG. 9, an incoming direction of the reflection wave in a vertical direction (θ0 direction) may be defined based on the frequency of the reception signal.

Therefore, among the reception signals extracted by the reception beam RB0, the reception signals at the frequencies of the first set and the second set of electric signals may be extracted. In a direction defined by the angle in the vertical direction (an angle in the θ0 direction) corresponding to the extracted frequency and the angle in the horizontal direction (an angle in the θ1 direction) based on the beamforming, by plotting data based on the intensity of the reception signal at a distance position based on a delay time of the reflection wave, a distribution of intensity data of the reception signals in the range where the reception beam RB0 intersects with the transmission beam TB0 may be acquired. Then, by turning the reception beam RB0 within a detection range in the horizontal direction and acquiring the distribution of the intensity data at the respective turning positions, the intensity data (volume data) which distribute three-dimensionally in all the detection range in the horizontal direction and the vertical direction can be acquired. By imaging the intensity data (volume data), an image indicative of a state of target object(s) in the detection range can be obtained.

Concrete Configuration

Figure 11:
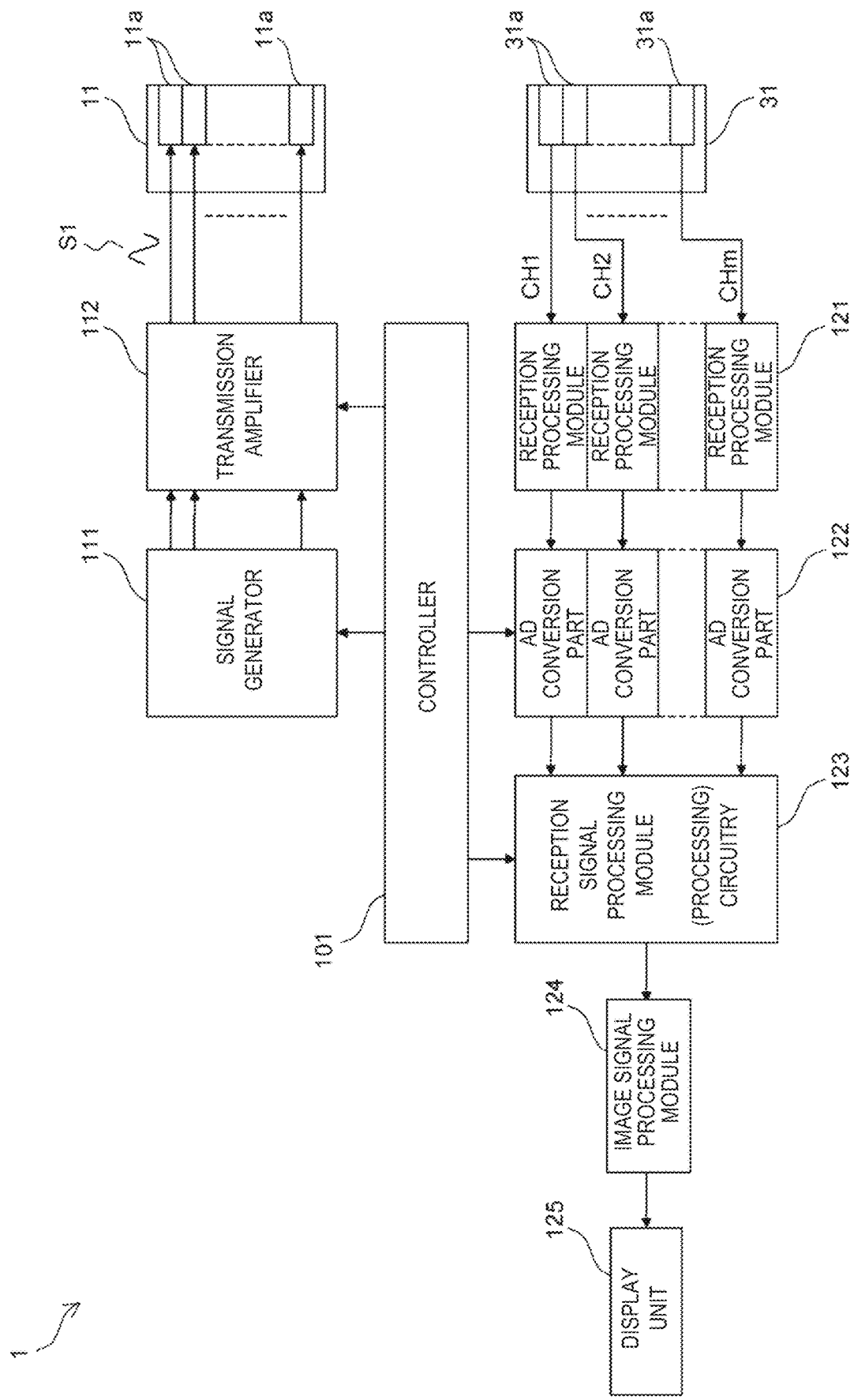
FIG. 11 is a block diagram illustrating a concrete configuration of a target detection device according to this embodiment.

FIG. 11 is a block diagram illustrating a concrete configuration of the target detection device 1.

The target detection device 1 may be provided with the transmission array 11 as the transmission system. The transmission array 11 may have the same configuration as FIG. 2. The target detection device 1 may include a signal generator 111 and a transmission amplifier 112, as a configuration for supplying a transmission signal S1 to each transmission element 11a of the transmission array 11. The signal generator 111 may have the same configuration as the circuitry illustrated in FIG. 2. According to the configuration of FIG. 11, the transmission amplifier 112 for amplifying the electric signal (transmission signal S1) outputted from the mixing circuit 24 of FIG. 2 and supplying it to each transmission element 11a may further be provided. Note that the transmission amplifier may be disposed between the transmission circuits 21a, 21b, and 22a-22c of FIG. 2, and the phase adjusting circuit 23.

The controller 101 may include an arithmetic processing circuit, such as a CPU (Central Processing Unit), and a storage media, such as a ROM (Read Only Memory), a RAM (Random Access Memory), and a hard disk drive. The controller 101 may be comprised of an integrated circuit, such as a FPGA (Field-Programmable Gate Array).

The controller 101 may cause the transmission circuits 21a, 21b, and 22a-22c illustrated in FIG. 2 to output the electric signals at the frequencies according to the first frequency table and the second frequency table. Thus, as illustrated with reference to FIG. 9, the transmission beams TB1 and TB2 may be transmitted from the transmission array 11. As described above, the transmission beams TB1 and TB2 may scan the ranges of the angles θ01 and θ02 by sequentially changing the frequencies of the first set and the second set of electric signals according to the first frequency table and the second frequency table, respectively. Therefore, the transmission beam TB0 of FIG. 10 may be formed.

The target detection device 1 may be provided with the reception array 31 described above, as the reception system. The reception array 31 may have the same configuration as FIG. 10. In the reception array 31, "m" reception elements 31a may be disposed. The reception signals may be outputted from the reception elements 31a to the corresponding channels CH1-CHm.

The target detection device 1 may include a plurality of reception processing modules 121, a plurality of A/D conversion parts 122, a reception signal processing module 123 (which may also be referred to as processing circuitry), and an image signal processing module 124, as a configuration for processing the reception signal outputted from each reception element 31a of the reception array 31 and generating a detection image.

The plurality of reception processing modules 121 may be connected to the channels CH1-CHm, respectively. Each reception processing module 121 may perform processing for removing an unnecessary band from the inputted reception signal, processing for amplifying the reception signal to a level suitable for A/D conversion, and processing for removing a signal component at a band more than half of a sampling period of the A/D conversion. The plurality of A/D conversion parts 122 may be associated with the plurality of reception processing modules 121, respectively. Each A/D conversion part 122 may convert the analog reception signal inputted from the corresponding reception processing module 121 into a digital signal at a given sampling period.

The reception signal processing module 123 may process the reception signals of the channels CH1-CHm inputted from the plurality of A/D conversion parts 122, respectively, to calculate the intensity data of the reception signals distributed three-dimensionally over the detection range (volume data). The reception signal processing module 123 may be comprised of a single integrated circuit (FPGA etc.) together with the controller 101.

The image signal processing module 124 may process the intensity data (volume data) inputted from the reception signal processing module 123 and generate the image data for imaging the state of the target object in the detection range. The image signal processing module 124 is comprised of a CPU, for example. A display unit 125 may be comprised of a monitor, and display the detection image according to the image data inputted from the image signal processing module 124.

FIG. 12A is a functional block diagram illustrating an example configuration of the reception signal processing module 123.

The reception signal processing module 123 may include an arithmetic processing circuit and a storage medium. The reception signal processing module 123 may perform a function of each functional block illustrated in FIG. 12A according to a program stored in the storage medium. A part of the functions of FIG. 12A may be implemented by hardware instead of software.

The reception signal processing module 123 may include a plurality of digital filters 201, a buffer 202, a plurality of band-pass filters 203, and a plurality of beam synthesizing parts 204.

The plurality of digital filters 201 may be provided corresponding to the plurality of A/D conversion parts 122 of FIG. 11. The digital filter 201 may be a filter sharper than the filtering function of the reception processing module 121 of FIG. 11, and remove signals of unnecessary bands in the reception signal.

The buffer 202 may temporarily hold the reception signals of the channels CH1-CHm outputted from the plurality of digital filters 201. The buffer 202 may hold the reception signals while the frequencies of the electric signals outputted from the transmission circuits 21a, 21b, and 22a-22c are changed into all the frequencies assigned to the first frequency table and the second frequency table (hereinafter, "the reception signals for one scan"), chronologically for a plurality of scans. The buffer 202 may sequentially supply the reception signals for one scan to the plurality of band-pass filters 203, respectively. The buffer 202 may eliminate the reception signals for one scan, when the reception signals for that one scan are supplied to the plurality of band-pass filters 203.

The plurality of band-pass filters 203 may extract the frequency components (frequency reception signals) at frequencies F1-Fn from the reception signals for one scan of the inputted channels CH1-CHm, respectively. The frequencies F1-Fn may correspond to the frequencies assigned to the first frequency table and the second frequency table. The number of band-pass filter 203 provided may be the total number of frequencies assigned to the first frequency table and the second frequency table. The reception signal at each frequency assigned to the first frequency table and the second frequency table may be extracted by each band-pass filter 203. Each band-pass filter 203 may extract the frequency component (frequency reception signal) at the frequency Fk set in itself from the reception signals for one scan of the channels CH1-CHm, and supply it to the beam synthesizing part 204.

The plurality of beam synthesizing parts 204 may be provided corresponding to the plurality of band-pass filters 203. The beam synthesizing part 204 may form the reception beam RB0 by the beamforming based on the phase control, and separate the frequency reception signal in the θ1 direction of FIG. 10 at a given resolution. Thus, the frequency reception signal in the area where the reception beam RB0 intersects with the transmission beam TB1 or TB2 of FIG. 9 defined by the band-pass filter 203, may be acquired. That is, from the top beam synthesizing part 204, the frequency reception signal in the crossing area where the transmission beam (either the transmission beams TB1 or TB2) at the angle θ0 direction (see FIG. 9) corresponding to the frequency F1 intersects with the reception beam RB0 in each direction parallel to the horizontal surface (the θ1 direction of FIG. 10), may be acquired.

The acquired frequency reception signal may change in the intensity on the time axis according to the intensity of the reflection wave from the crossing area. This time axis may correspond to a distance from the reception array 31 in the crossing area. Therefore, by mapping each intensity on the time axis at the corresponding distance position from the reception array 31 in the crossing area, the distribution of the intensity data on the crossing area may be acquired. Thus, by integrating the distributions of the intensity data per direction, outputted from the beam synthesizing parts 204, the volume data where the intensity data is distributed three-dimensionally over the detection range may be acquired.

FIG. 12B is a functional block diagram illustrating another example configuration of the reception signal processing module 123.

In this example configuration, the band-pass filter 203 in the example configuration of FIG. 12A may be replaced by an FFT (Fast Fourier Transform) 211 and a frequency extracting part 212. The FFT 211 may calculate frequency spectrum from the reception signals for one scan of the channels CH1-CHm. The frequency extracting part 212 may extract the frequency components (frequency reception signals) at the frequencies F1-Fn from the frequency spectrum of each channel calculated by the FFT 211, and supply them to the beam synthesizing part 204. Processing of the beam synthesizing part 204 may be the same as FIG. 12A.

Also according to this configuration, by integrating the distributions of the intensity data per direction, outputted from the beam synthesizing parts 204, the volume data where the intensity data is distributed three-dimensionally over the detection range may be acquired, similar to the configuration of FIG. 12A. Note that, in the example configuration of FIG. 12B, the frequencies at which the frequency reception signals are extracted can be set more finely than the example configuration of FIG. 12A. Therefore, when the number of the plurality of frequencies assigned to the first frequency table and the second frequency table is large, or when these frequencies are close to each other, it is advantageous to use the configuration of FIG. 12B.

Figures 13A, 13B:
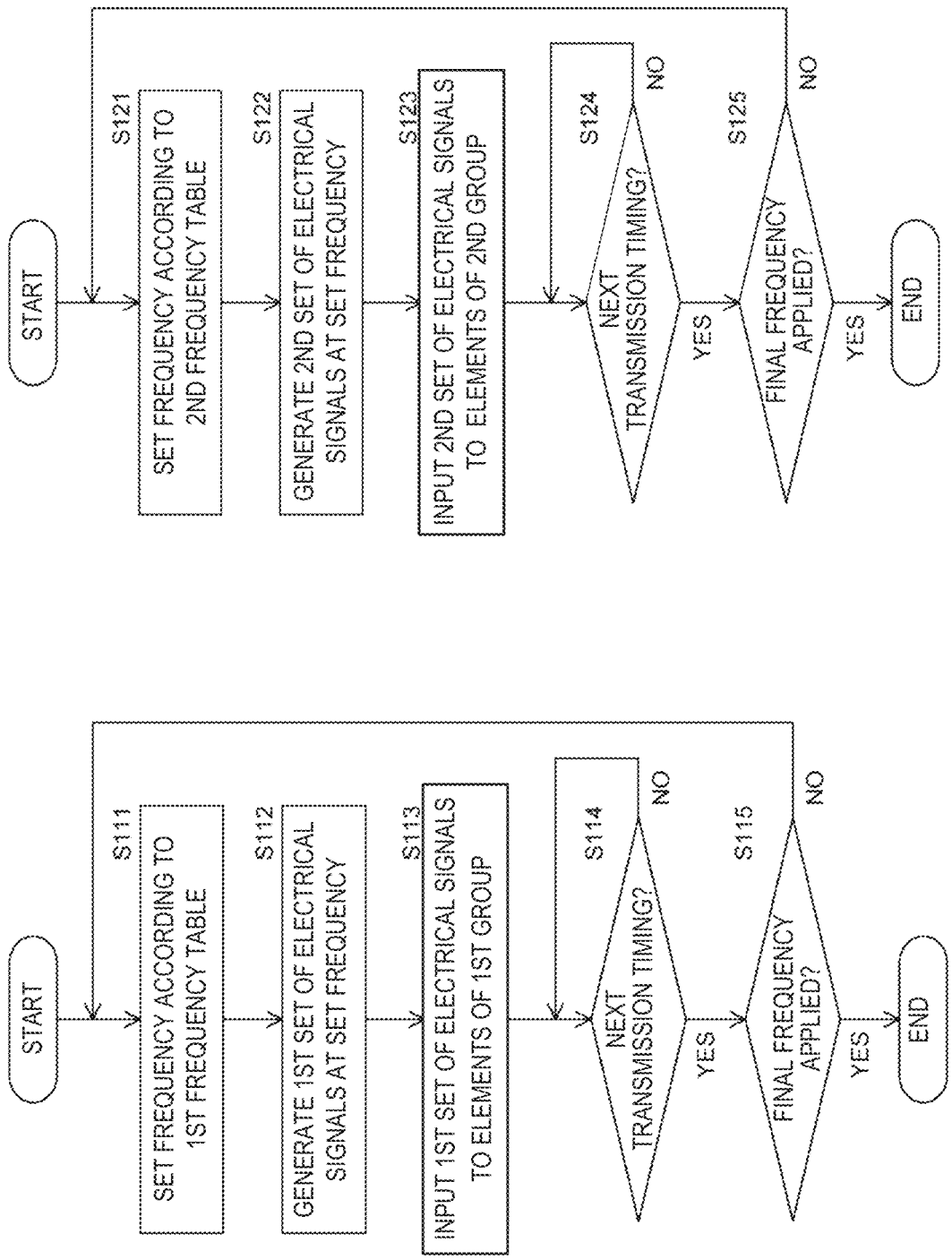
FIG. 13A is a flowchart illustrating processing for transmitting transmission waves from the transmission elements which are grouped conforming to the first grouping configuration, according to this embodiment.
FIG. 13B is a flowchart illustrating processing for transmitting transmission waves from the transmission elements which are grouped conforming to the second grouping configuration, according to this embodiment.

FIGS. 13A and 13B are flowcharts illustrating the transmission processing performed by the controller 101 of FIG. 11. This processing may be continuously performed during the detection operation, and be ended according to a termination of the detection operation. The processings of FIGS. 13A and 13B may be performed in synchronization with each other.

FIG. 13A is a flowchart illustrating the transmission processing to the transmission elements 11a of the group GR1.

The controller 101 may set the electric signals outputted from the transmission circuits 21a and 21b at the first frequency assigned to the first frequency table (S111), and cause the transmission circuits 21a and 21b to output the electric signals for a given period (S112). Thus, through the mixing circuit 24, the first set of electric signals may be inputted into the transmission elements 11a of the group GR1 (S113), and the grating lobe (transmission beam TB1) based on the first set of electric signals may be transmitted from the transmission array 11.

Then, the controller 101 may wait for the lapse of the given period of the electric signal (S114: NO). When the given period passes and the next transmission timing comes (S114: YES), the controller 101 may return the processing to Step S111, set the electric signals outputted from the transmission circuits 21a and 21b at the second frequency assigned to the first frequency table, and perform similar processing. Thus, the transmitting direction of the grating lobe (transmission beam TB1) may change in the angle θ01 direction of FIG. 9. The controller 101 may repeat similar processing until the final frequency assigned to the first frequency table is applied to the transmission circuits 21a and 21b (S115: NO). Therefore, the transmitting direction of the grating lobe (transmission beam TB1) may be changed within the range of the angle θ01 of FIG. 9, and the range of the angle θ01 may be scanned by the grating lobe (transmission beam TB1).

Thus, when all the frequencies assigned to the first frequency table are applied to the transmission circuits 21a and 21b and the transmission beam TB1 for one scan is transmitted (S115: YES), the controller 101 may end the processing. In this way, after the final transmission for one scan is performed, the controller 101 suspends the transmission until a reception period, corresponding to the transmission, ends. Then, when the reception period ends, the controller 101 may again perform the processing of FIG. 13A to perform the transmission for the next scan. In this way, the controller 101 may cause the transmission array 11 to transmit the grating lobe (transmission beam TB1) while cyclically changing the frequency applied to the transmission circuits 21a and 21b based on the frequencies assigned to the first frequency table. Therefore, the range of the angle θ01 of FIG. 9 may be repeatedly scanned by the transmission beam TB1.

FIG. 13B is a flowchart illustrating the transmission processing to the transmission elements 11a of the group GR2.

The controller 101 may set the electric signals outputted from the transmission circuits 22a-22c at the first frequency assigned to the second frequency table (S121), and cause the transmission circuits 22a-22c to output the electric signals for a given period (S122). Therefore, through the mixing circuit 24, the second set of electric signals may be inputted into the transmission elements 11a of the group GR2 (S123), and the grating lobe (transmission beam TB2) based on the second set of electric signals may be transmitted from the transmission array 11.

Then, similar to FIG. 13A, the controller 101 may repeatedly perform the processing at Steps S121-S124 until the final frequency assigned to the second frequency table is applied to the transmission circuits 22a-22c (S125: NO). Moreover, when the reception period for the final transmission for one scan ends, the controller 101 may again perform the processing of FIG. 13B to repeat similar transmission processing. Thus, the grating lobe (transmission beam TB2) may be transmitted from the transmission array 11, while the frequency applied to the transmission circuits 22a-22c is cyclically changed based on the frequencies assigned to the second frequency table. In this way, the range of the angle θ02 of FIG. 9 may be scanned by the grating lobe (transmission beam TB2).

Note that since in this embodiment the number of frequencies assigned to the second frequency table is less than the number of frequencies assigned to the first frequency table, the period during which all the frequencies are applied to each transmission circuit may become shorter in the processing of FIG. 13B than the processing of FIG. 13A, if the switching timings at Steps S114 and S124 are the same. Therefore, the controller 101 may adjust the switching timings at Step S114 and S124 so that the period during which all the frequencies are applied to each transmission circuit is the same in the processing of FIG. 13A and the processing of FIG. 13B.

Alternatively, after the processing of FIG. 13B for one scan ends, the controller 101 may suspend the processing of FIG. 13B until the processing of FIG. 13A is performed for one scan, and after the processing of FIG. 13A for one scan is finished, the controller 101 may start the processing for the next scan of FIG. 13B at the timing where the final reception period is ended. Therefore, the reception signals for one scan to each processing can be acquired for every fixed period.

Figure 14:
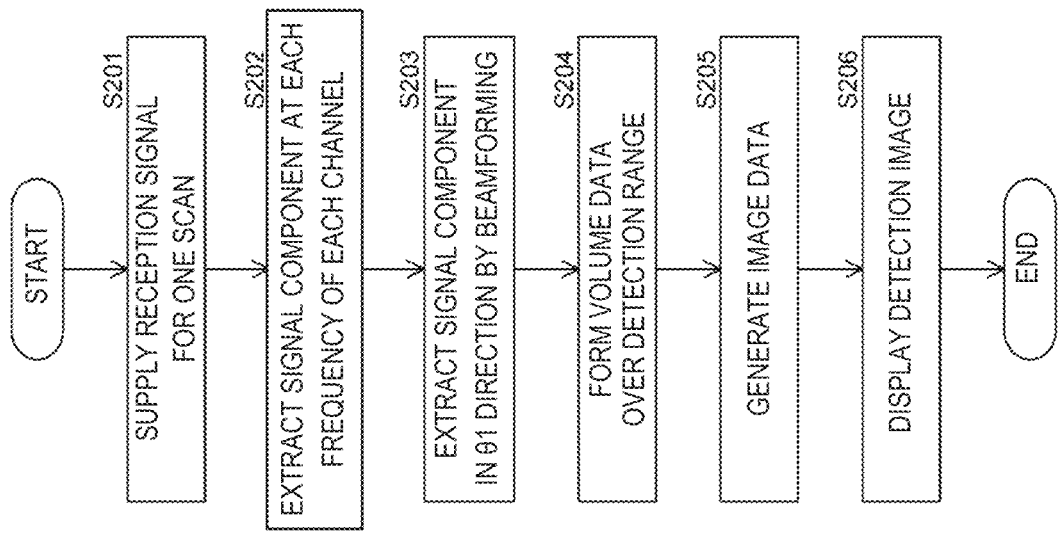
FIG. 14 is a flowchart illustrating processing for processing reception signals and displaying a detection image, according to this embodiment.

FIG. 14 is a flowchart illustrating processing for processing the reception signals and displaying the detection image. This processing may be continuously performed during the detection operation, and be ended according to the termination of the detection operation.

The reception signals for one scan may be supplied to the plurality of band-pass filters 203 from the buffer 202 (S201). Each band-pass filter 203 may extract the frequency component (frequency reception signal) at the frequency set in itself from the inputted reception signals of each channel, and supply it to the corresponding beam synthesizing part 204 (S202). The beam synthesizing part 204 may extract the signal component in each horizontal direction (θ1 direction) by beamforming from the inputted frequency components (frequency reception signals) (S203). Thus, the distribution of the intensity data where the intensity data of the reception signal may be mapped in the range where the transmitting direction defined by each frequency intersects with each direction of the beamforming is acquired. The reception signal processing module 123 may integrate the intensity data from all the beam synthesizing parts 204, and form the volume data where the intensity data is distributed three-dimensionally over the detection range (S204). The reception signal processing module 123 may supply the volume data to the image signal processing module 124.

The image signal processing module 124 may process the volume data to generate the image data for displaying the detecting situation of the target object(s) in the detection range, and supply the generated image data to the display unit 125 (S205). The display unit 125 may display the image based on the inputted image data (S206). Therefore, the detecting situation of the target object(s) for one scan in the detection range may be displayed. In this way, the processing for one scan may end. Then, the processing of FIG. 14 may be repeated and the detection image for the subsequent scan may be displayed on the display unit 125.

Figure 15:
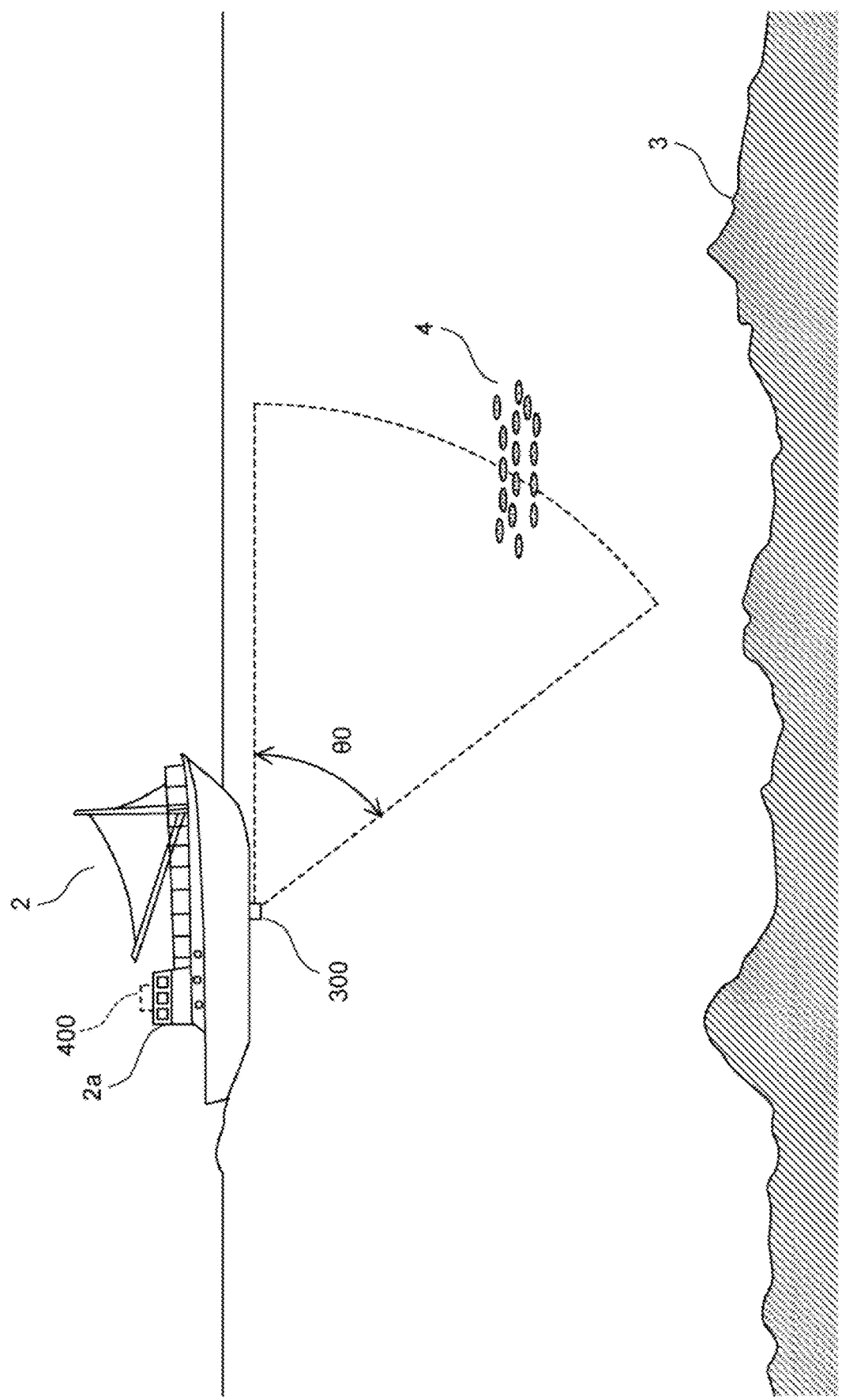
FIG. 15 is a view schematically illustrating a configuration of the target detection device according to this embodiment, when it is used as a sonar which detects an underwater target object.

FIG. 15 is a view schematically illustrating a configuration of the target detection device 1 when it is used as a sonar which detects an underwater target object.

A transducer 300 may be installed on the bottom of a ship 2. The transducer 300 may include the transmission array 11 and the reception array 31. The transmission array 11 may transmit the transmission wave underwater by the processing described above. Here, an acoustic wave (e.g., an ultrasonic wave) may be transmitted as the transmission wave. Therefore, the transmission beams TB1 and TB2 may be scanned in the range of the angle θ0 parallel to the vertical plane.

Configurations of FIG. 11 other than the transmission array 11, the reception array 31, and the display unit 125 may be provided to a control device installed in a control room 2a of the ship 2. The display unit 125 may be installed in the control room 2*a*, separately from the control device. The display unit 125 may also be integrally provided with the control device.

According to this configuration, the detection image indicative of a situation of a seabed 3 and a school of fish 4 may be displayed on the display unit 125. Therefore, a user can grasp the underwater situation. Note that four transducers 300 which are directed forward, rearward, leftward, and rightward may be installed on the bottom of the ship. In this case, the configurations of the transmission system and the reception system of FIG. 11 may be prepared for every transducer 300. Thus, the detection image of all directions from the ship can be displayed on the display unit 125.

Moreover, if the target detection device 1 is used as a radar which detects a target object in the air, the transducer 400 may be installed in an upper part of a control room 2*a*, for example. The transducer 400 may include the transmission array 11 and the reception array 31. The transmission array 11 may transmit the transmission wave in the air by the processing described above. Here, a radio wave may be transmitted as the transmission wave. The configuration of the circuitry may be installed in the control room 2*a*, similar to the case of the sonar.

According to this configuration, the detection image indicative of a situation of an obstacle and a flock of birds may be displayed on the display unit 125. Therefore, the user can grasp the situation in the air. Note that the transducer 400 may be installed on each of front, rear, right, and left side surfaces of the control room 2*a*. In this case, the configuration of the transmission system and the reception system of FIG. 11 may be prepared for every transducer 400. Therefore, the detection image of a space all around the ship can be displayed on the display unit 125.

Effects of Embodiment

According to this embodiment, the following effects may be demonstrated.

The grating lobe transmitted from the transmission elements 11*a* grouped conforming to the first grouping configuration (group GR1), and the grating lobe transmitted from the transmission elements 11*a* grouped conforming to the second grouping configuration (group GR2) can be differentiated in the transmitting direction. Therefore, a plurality of the transmission beams (grating lobes) with different transmitting directions can be transmitted by the single transmission array 11. Therefore, the target object can be smoothly detected by the simple configuration.

Moreover, since the common transmission elements 11*a* are used for the first grouping configuration and the second grouping configuration, it may not be necessary to separately prepare the transmission elements 11*a* for each of the first grouping configuration and the second grouping configuration. Therefore, the configuration of the transmission array 11 can be simplified, and the cost can be reduced.

Moreover, since the spacing or interval of the transmission elements 11*a* is constant, the grating lobes can appear smoothly in the given transmitting directions by adjusting the phases of the first set and the second set of electric signals.

Moreover, as illustrated in FIG. 2, since the mixing circuit 24, which mixes the electric signal of the first set and the electric signal of the second set and inputs the mixed electric signal into the corresponding transmission element 11*a*, may be provided, the grating lobe (transmission beam TB1) based on the first set of electric signals and the grating lobe (transmission beam TB2) based on the second set of electric signals can be transmitted simultaneously, as illustrated in FIG. 9. Therefore, the target object over the detection range can be promptly detected.

Moreover, the frequencies of the first set of electric signals assigned to the first frequency table may differ from the frequencies of the second set of electric signals assigned to the second frequency table. Thus, the reception signal processing module 123 illustrated in FIG. 11 can extract the reception signals based on the grating lobe of the first set of electric signals and the reception signals based on the grating lobe of the second set of electric signals according to the frequencies. Therefore, even if the two grating lobes are simultaneously transmitted by the mixing of the electric signals by the mixing circuit 24, the reception signal processing module 123 can appropriately extract the reception signals based on each grating lobe, and can smoothly detect the target object which exists in the direction of each grating lobe.

As illustrated in FIGS. 13A and 13B, the signal generator 111 may change the frequencies of the first set of electric signals according to the first frequency table, and change the frequencies of the second set of electric signals according to the second frequency table. Thus, by changing the frequencies in this way, the transmitting directions of the grating lobes based on the electric signals of the first set and the second set can be changed, as illustrated in the simulation results. Therefore, these grating lobes can each scan the given angle range and can extend the detection range of the target object.

As illustrated with reference to FIGS. 12A and 12B, the reception signal processing module 123 may extract the reception signals based on the reflection waves of the grating lobe based on the frequency components of the reception signals. Therefore, the reception signals based on each grating lobe transmitted from the transmission array 11 can be acquired properly. Therefore, the target object can be detected properly based on the reception signals.

As illustrated in FIG. 10, the reception array 31 may be different than the transmission array 11. The reception array 31 may include the plurality of reception elements 31*a*, and the reception beam generated based on the reception signal produced from each reception element 31*a* may intersect with the transmission beam generated by the transmission array 11. According to this configuration, the distribution of the intensity data based on the intensities of the reflection waves can be calculated in the range where the reception beam RB0 and the transmission beam TB0 (grating lobe) cross. Therefore, by changing the orientation of the reception beam RB0 by the beamforming within the detection range, the intensity data of the reflection waves distributed three-dimensionally over the detection range can be formed.

Modification 1

Figure 16:
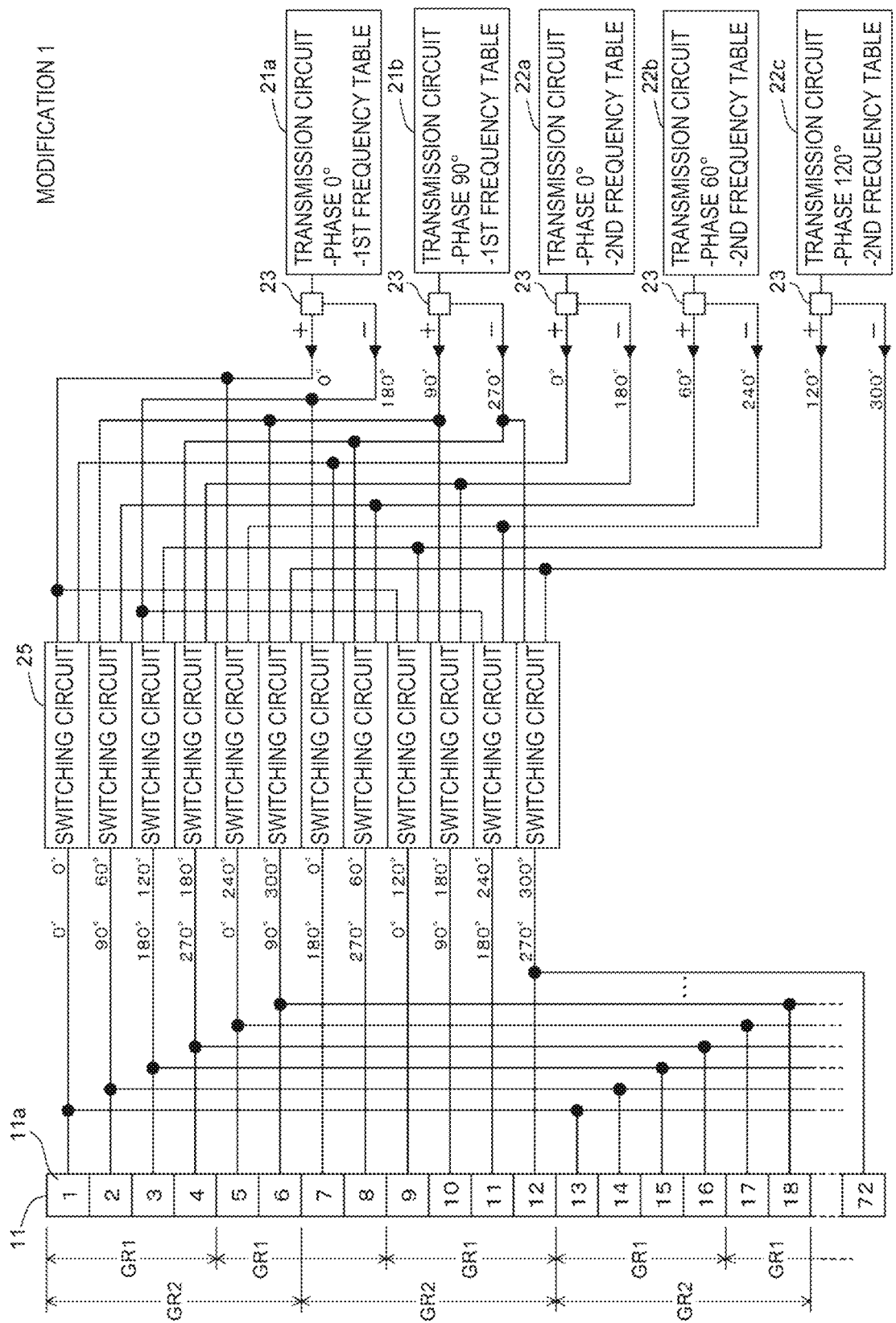
FIG. 16 is a view illustrating a configuration of a transmission system according to Modification 1.

In the above embodiment, as illustrated in FIG. 2, the two routes of electric signals may be mixed by the mixing circuit 24 and inputted into the corresponding transmission elements 11*a*. However, as illustrated in FIG. 16, the electric signal inputted into the transmission element 11*a* may be switched in a time-divided manner between the two routes of electric signals. According to such a configuration, while one frequency is applied to the transmission circuits 21*a*, 21*b*, and 22*a*-22*c*, a switching circuit 25 may be switched so that the first set of electric signals and the second set of electric signals at the frequency are supplied to the transmission element 11*a* in the time-divided manner. According to this configuration, the transmission beams TB1 and TB2 illustrated in FIG. 9 are not transmitted simultaneously, but are alternately transmitted according to the switching of the switching circuit 25.

Also according to this configuration, by changing the frequency applied to the transmission circuits 21a, 21b, and 22a-22c according to the first frequency table and the second frequency table, the transmission beams TB1 and TB2 can scan the ranges of the angles θ01 and θ02, similar to the above embodiment. Therefore, it is not necessary to provide a plurality of transmission arrays 11, and the target object can be detected with the simple configuration.

However, according to this configuration, since the transmission beams TB1 and TB2 are not transmitted simultaneously but are alternately transmitted according to the switching of the switching circuit 25, a period of the transmission beams TB1 and TB2 scanning the ranges of the angles θ01 and θ02 may become longer. Therefore, in order to scan more promptly, it is desirable to mix the two routes of electric signals by the mixing circuit 24 and supply it to the transmission element 11a similarly to the above embodiment.

Note that, in the configuration of FIG. 16, the switching circuit 25 may be comprised of a switching circuit using a multiplexer or a transistor. However, the configuration of the switching circuit 25 is not limited to this. For example, an electromagnetically driven mechanical switch may be used as the switching circuit 25.

Note that, according to the configuration of Modification 1, since the first set of electric signals and the second set of electric signals may be inputted in the time-divided manner to the transmission elements 11a of the group GR1 and the transmission elements 11a of the group GR2, the transmission beams TB1 and TB2 (grating lobe) of FIG. 9 may be transmitted in the time-divided manner. Therefore, the reception signal processing module 123 of FIG. 11 may not need to be provided with the configuration for extracting the reception signals based on the first set of electric signals and the reception signals based on the second set of electric signals according to the frequency. The reception signal processing module 123 may identify the transmitting directions of the transmission beams TB1 and TB2 according to the transmission timings of the transmission beams TB1 and TB2.

In this case, for example, the controller 101 may output the frequency of the transmission beam transmitted at each transmission timing to the reception signal processing module 123, and the reception signal processing module 123 may identify the transmitting directions of the transmission beams TB1 nd TB2 based on the inputted frequencies. Alternatively, the controller 101 may transmit to the reception signal processing module 123 other information from which the transmitting directions of the transmitted transmission beams TB1 and TB2 can be identified, at each transmission timing, and the reception signal processing module 123 may identify the transmitting directions of the transmitted transmission beams TB1 and TB2 based on this information.

Modification 2

In the above embodiment, the electric signals at different phases may be inputted to the plurality of transmission elements 11a which constitute the group GR1 and the group GR2. However, in Modification 2, the electric signals at the same phase may be inputted to a given number of transmission elements 11a among the plurality of transmission elements 11a which constitute the group GR1 and the group GR2.

Figure 17:
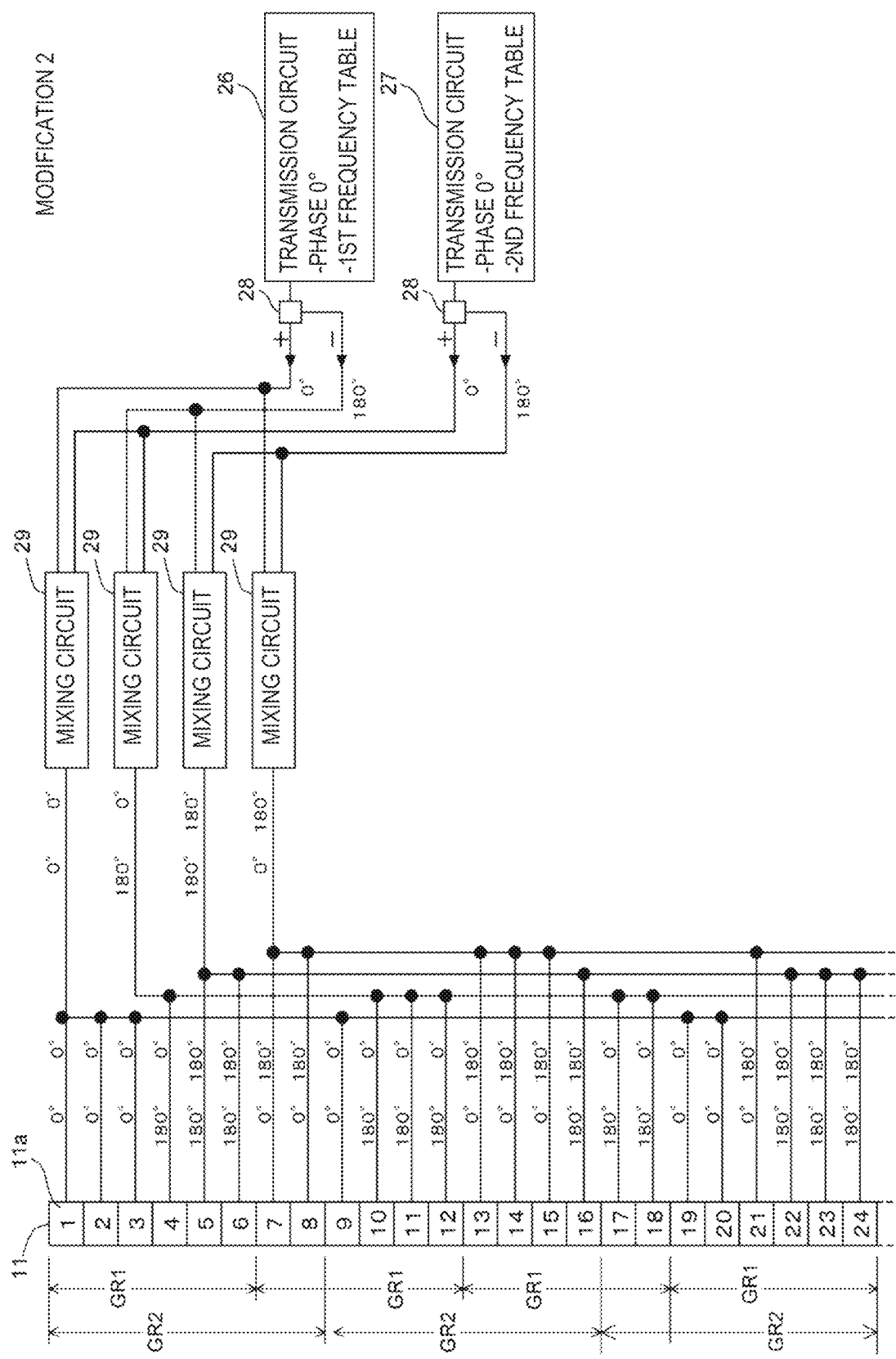
FIG. 17 is a view illustrating a configuration of a transmission system according to Modification 2.
Figure 18A:
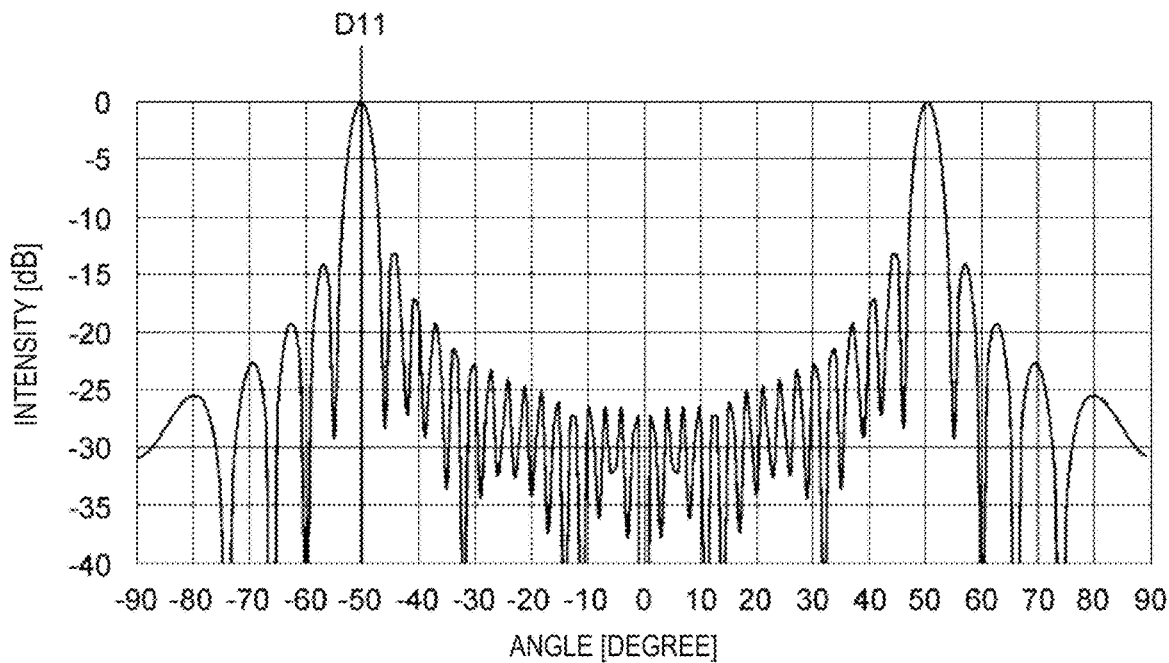
FIG. 18A is a simulation result of the appearing mode of the grating lobe when applying the first set of electric signals to each group of transmission elements conforming to the first grouping configuration according to Modification 2.
Figure 18B:
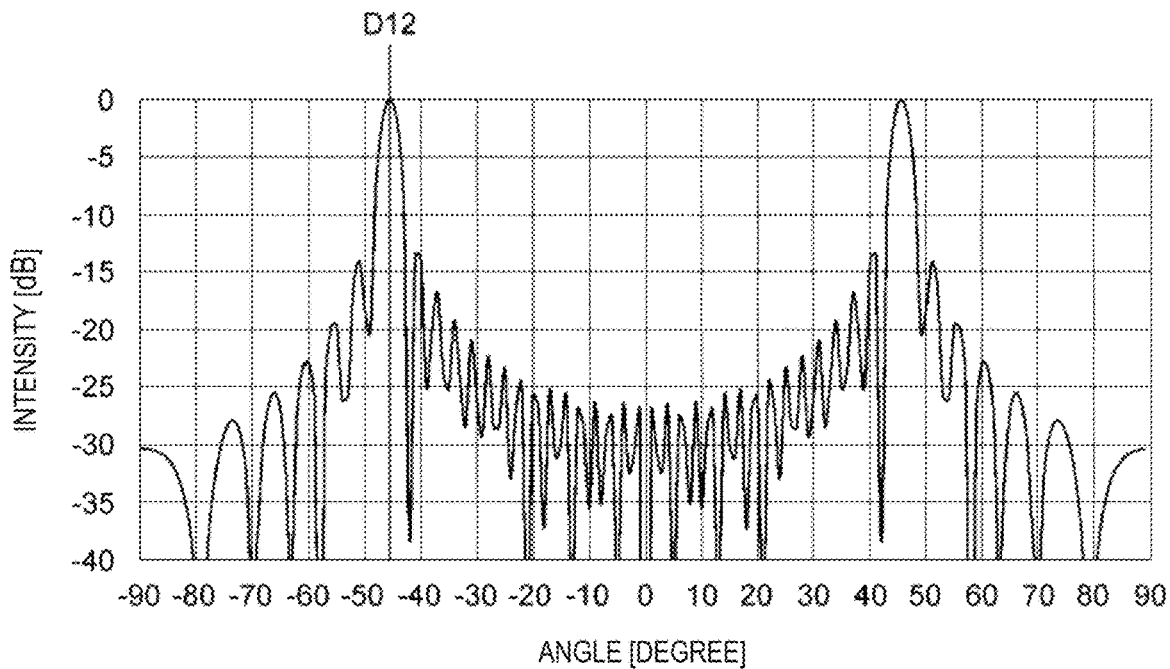
FIG. 18B is a simulation result of the appearing mode of the grating lobe when applying the first set of electric signals to each group of transmission elements conforming to the first grouping configuration according to Modification 2.
Figure 19A:
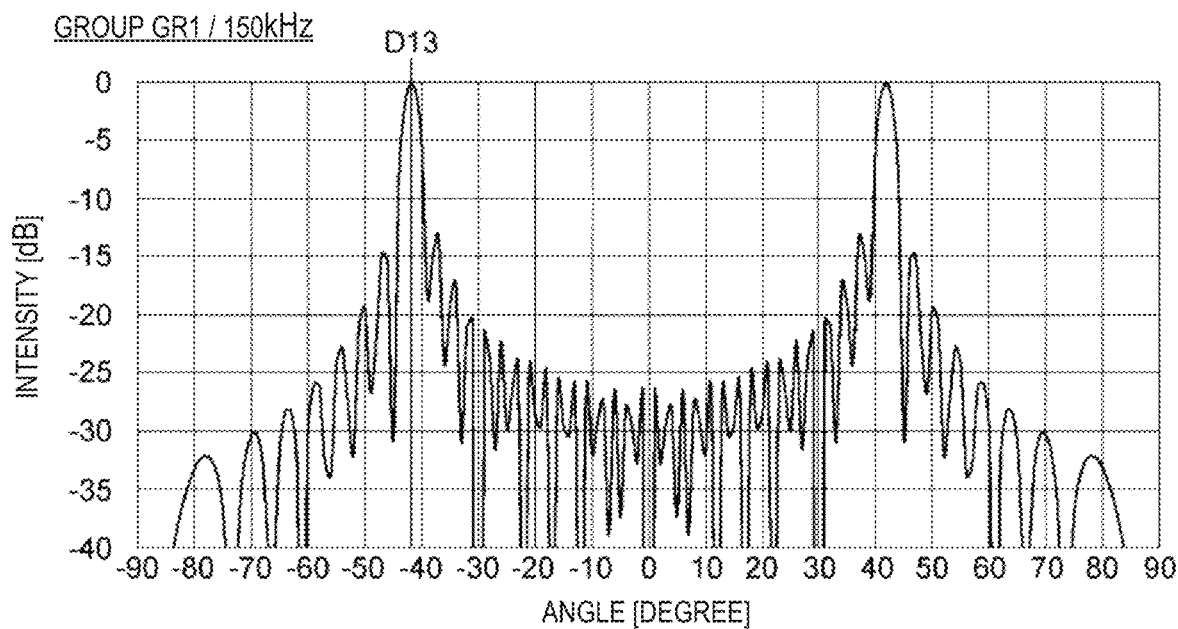
FIG. 19A is a simulation result of the appearing mode of the grating lobe when applying the first set of electric signals to each group of transmission elements conforming to the first grouping configuration according to Modification 2.
Figure 19B:
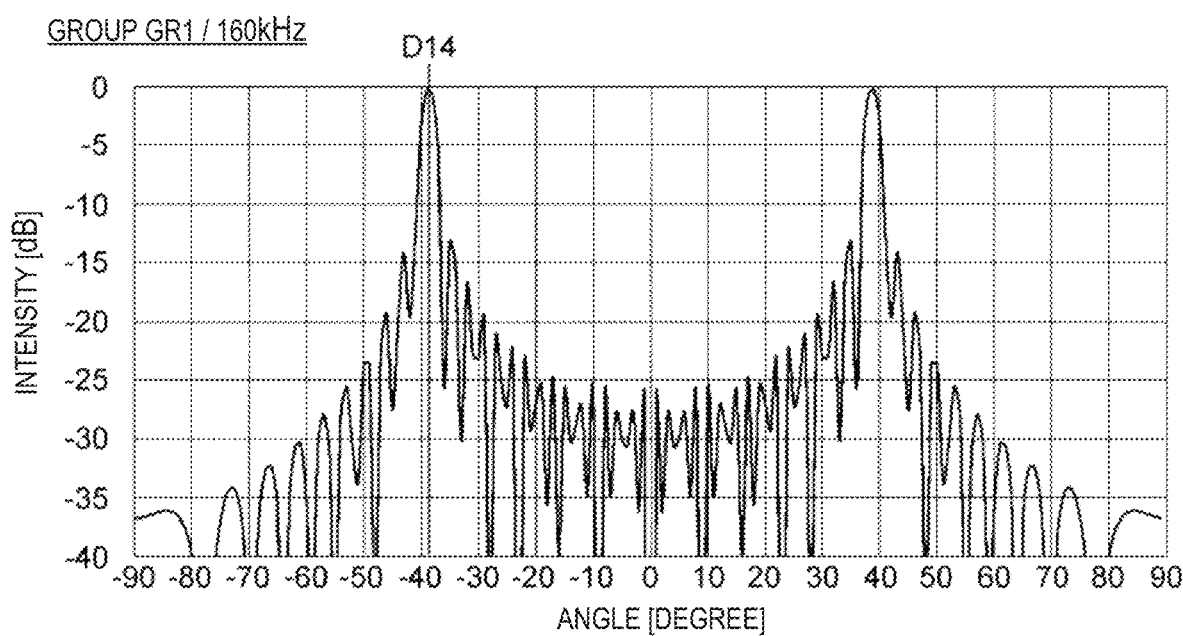
FIG. 19B is a simulation result of the appearing mode of the grating lobe when applying the first set of electric signals to each group of transmission elements conforming to the first grouping configuration according to Modification 2.
Figure 19C:
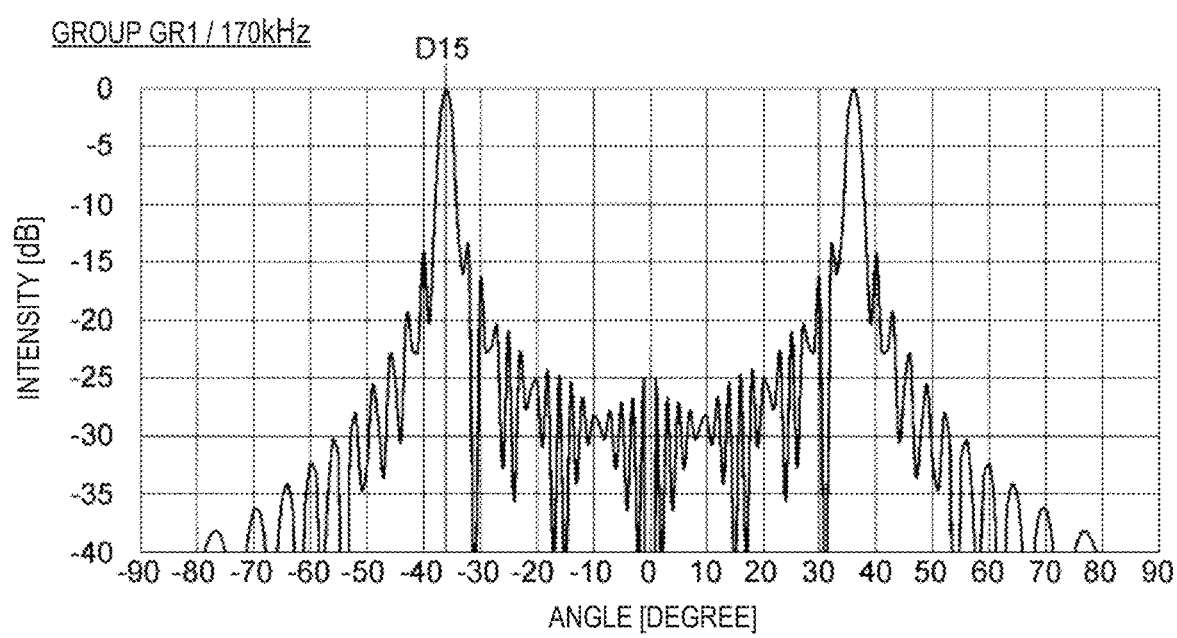
FIG. 19C is a simulation result of the appearing mode of the grating lobe when applying the first set of electric signals to each group of transmission elements conforming to the first grouping configuration according to Modification 2.
Figure 20A:
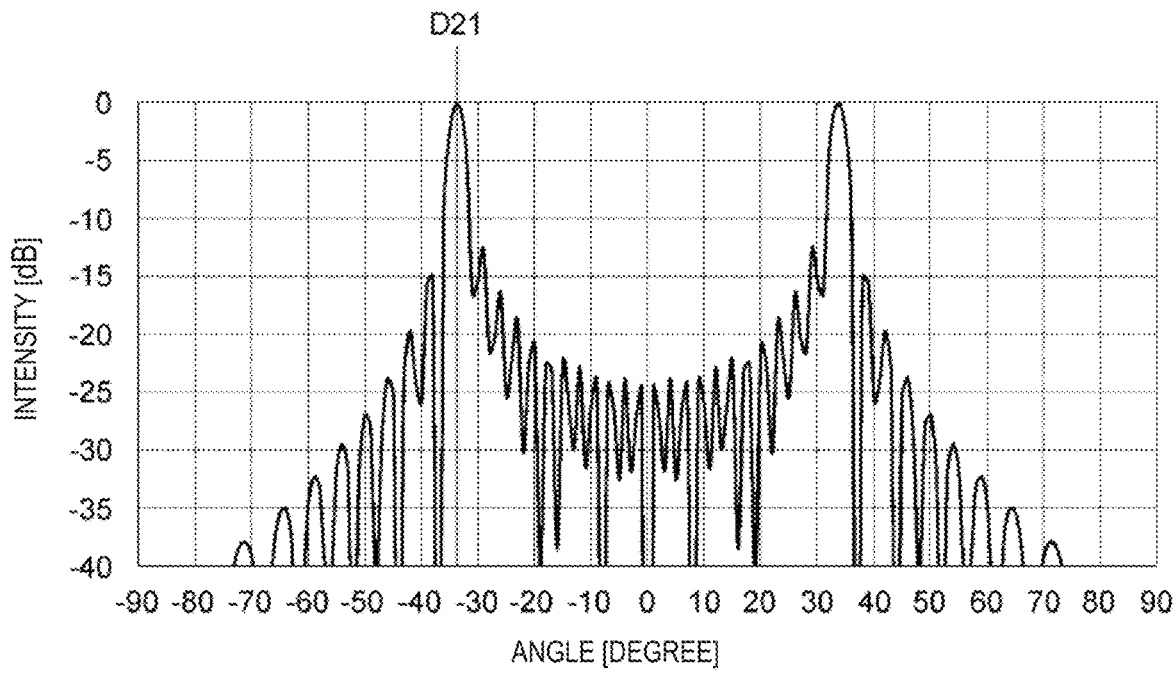
FIG. 20A is a simulation result of the appearing mode of the grating lobe when applying the second set of electric signals to each group of transmission elements conforming to the second grouping configuration according to Modification 2.
Figure 20B:
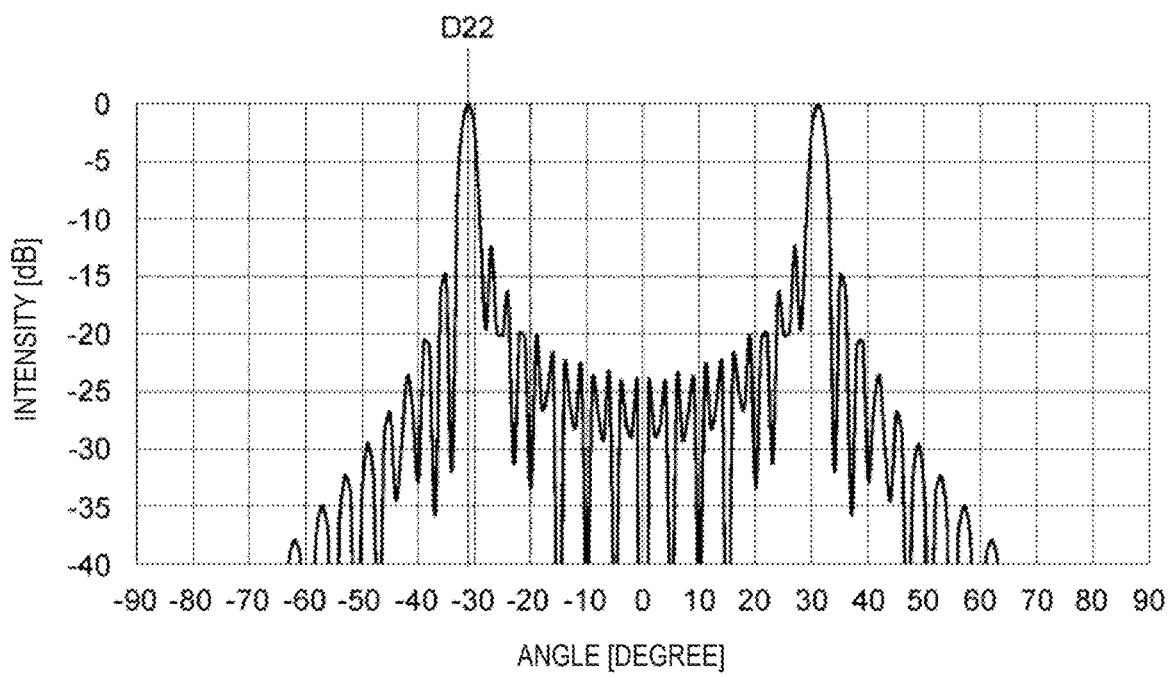
FIG. 20B is a simulation result of the appearing mode of the grating lobe when applying the second set of electric signals to each group of transmission elements conforming to the second grouping configuration according to Modification 2.
Figure 21A:
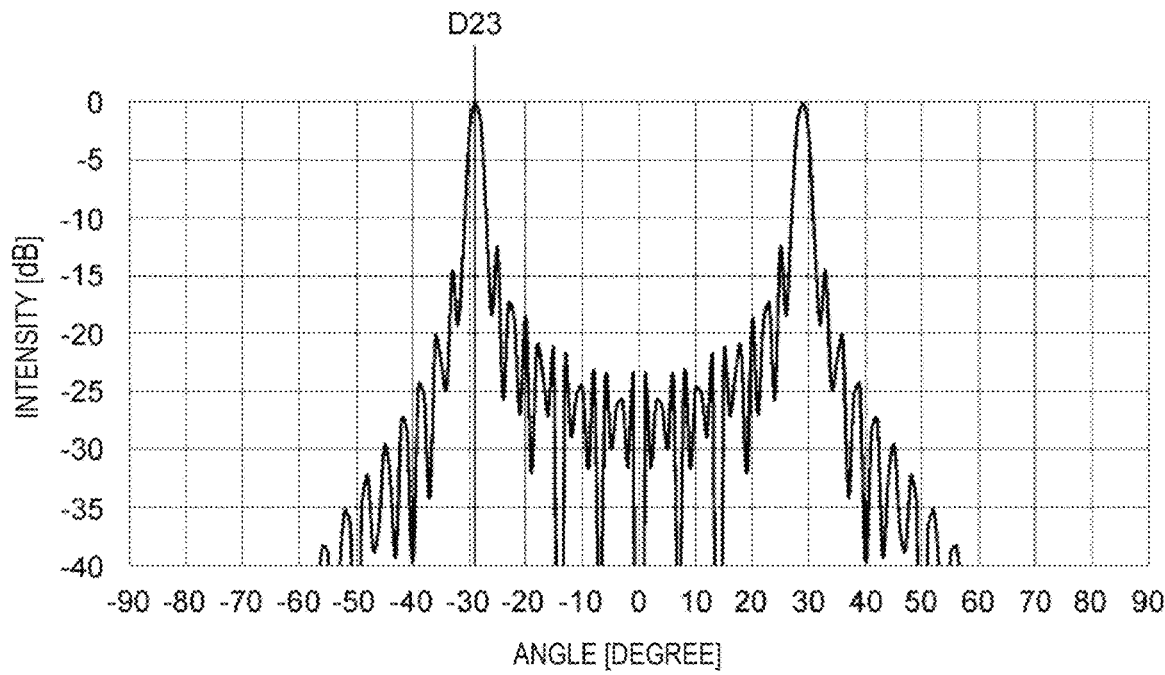
FIG. 21A is a simulation result of the appearing mode of the grating lobe when applying the second set of electric signals to each group of transmission elements conforming to the second grouping configuration according to Modification 2.
Figure 21B:
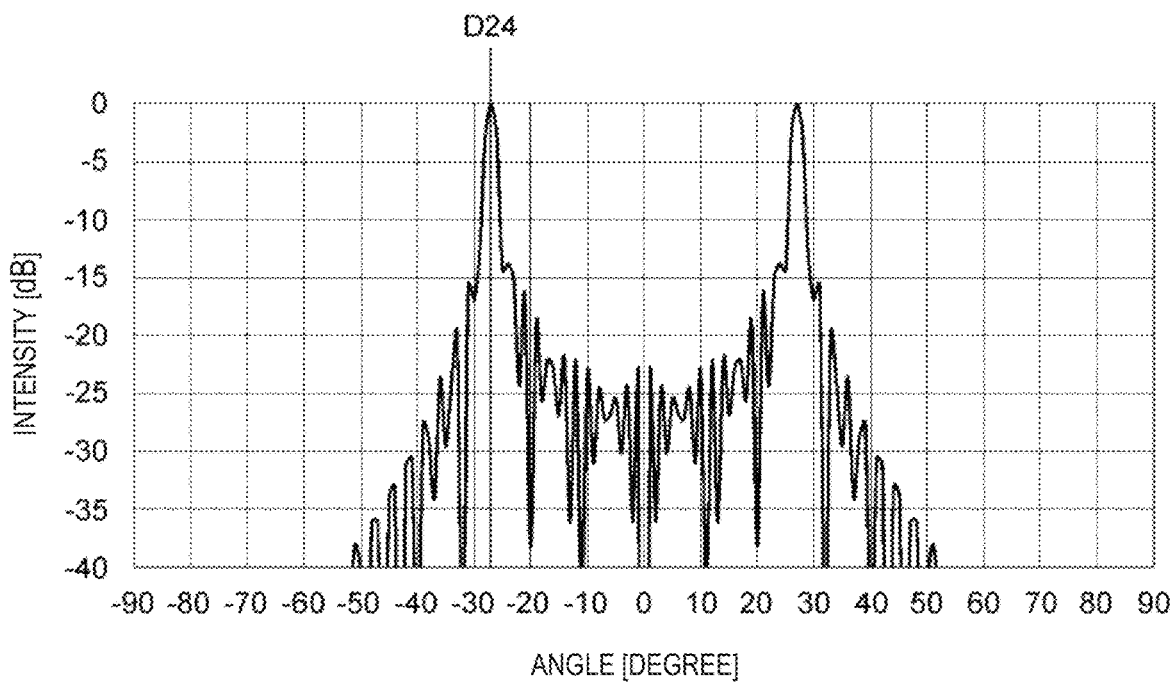
FIG. 21B is a simulation result of the appearing mode of the grating lobe when applying the second set of electric signals to each group of transmission elements conforming to the second grouping configuration according to Modification 2.

FIG. 17 is a view illustrating a configuration of a transmission system according to Modification 2.

As illustrated in FIG. 17, in the first grouping configuration, the group GR1 may be comprised of six transmission elements 11a, and in the second grouping configuration, the group GR2 may be comprised of eight transmission elements 11a. The electric signals of the first set at 0° phase may be inputted into three adjacent transmission elements 11a among the six transmission elements 11a which constitute the group GR1, and the first set of electric signals at 180° phase may be inputted into other three adjacent transmission elements 11a. Moreover, the second set of electric signals at 0° phase may be inputted into four adjacent transmission elements 11a among the eight transmission elements 11a which constitute the group GR2, and the second set of electric signals at 180° phase may be inputted into other four adjacent transmission elements 11a. The electric signals of the first set and the second set may be inputted into the 25th and subsequent transmission elements 11a so that similar phase pattern as the 1st to 24th transmission elements 11a is repeated.

According to the configuration of Modification 2, two kinds of electric signals with different phases may be inputted to the six transmission elements 11a included in the group GR1. That is, the number (six) of transmission elements 11a included in the group GR1 may be a multiple (three times) of the number (two) of kinds of electric signals of the first set. Moreover, two kinds of electric signals with different phases may be inputted to the eight transmission elements 11a included in the group GR2. That is, the number (eight) of transmission elements 11a included in the group GR2 may be a multiple (four times) of the number (two) of kinds of electric signals of the second set. Note that, also in the above embodiment, the numbers of transmission elements 11a included in the group GR1 and the group GR2 (four and six respectively) are multiple (1 time) of the numbers of kinds of electric signals of the first set and the second set (four and six respectively). Therefore, the number "p" of transmission elements 11a in the group GR1 may be a multiple of the number of kinds of electric signals of the first set; and the number "q" of transmission elements 11a in the group GR2 may be a multiple of the number of kinds of electric signals in the second set.

The electric signals of the first set may be generated by a transmission circuit 26 and a phase adjusting circuit 28 connected to the transmission circuit 26. The electric signals of the second set may be generated by a transmission circuit 27 and a phase adjusting circuit 28 connected to the transmission circuit 27. The phase adjusting circuit 28 may have the same configuration as the phase adjusting circuit 23 in the above embodiment. A mixing circuit 29 may mix and output the inputted electric signals of the two routes. The mixing circuit 29 may have the same configuration as the mixing circuit 24 in the above embodiment.

The transmission circuits 26 and 27 may each output the sine-wave electric signal at 0° phase. The transmission circuit 26 may change the frequency of the electric signal to be output, based on the frequencies assigned to the first frequency table. For example, frequencies of 130, 140, 150, 160, and 170 kHz are assigned to the first frequency table. The transmission circuit 27 may change the frequency of the electric signal to be output, based on the frequencies assigned to the second frequency table. For example, the frequencies of 135, 145, 155, and 165 kHz are assigned to the second frequency table.

In the configuration of FIG. 17, since the electric signals at the same phase are inputted to the three adjacent transmission elements 11a among the six transmission elements 11a of the group GR1, the three adjacent transmission elements 11a may function as a single transmission area. Therefore, as for the transmission elements 11a of the group GR1, the phase of the electric signals may be changed at a pitch between the transmission areas comprised of the three adjacent transmission elements 11a. For example, when the pitch between the transmission elements 11a is 2.5 mm, the pitch at which the phase of the electric signal changes is 7.5 mm.

Moreover, since the electric signals at the same phase are inputted to the four adjacent transmission elements 11a among the eight transmission elements 11a of the group GR2, the four adjacent transmission elements 11a may function as a single transmission area. Therefore, as for the transmission elements 11a of the group GR2, the phase of the electric signals may be changed at a pitch between the transmission areas comprised of the four adjacent transmission elements 11a. For example, when the pitch between the transmission elements 11a is 2.5 mm, the pitch at which the phase of the electric signal changes is 10 mm.

Thus, in Modification 2, the pitch at which the phase of the electric signals is changed may differ between the case where the first set of electric signals are inputted into the transmission elements 11a of the group GR1 and the case where the second set of electric signals are inputted into the transmission elements 11a of the group GR2. Therefore, the transmitting direction of the grating lobe caused by the transmission elements 11a of the group GR1 may differ from the transmitting direction of the grating lobe caused by the transmission elements 11a of the group GR2. Then, by changing the frequencies of the first set of electric signals and the second set of electric signals according to the first frequency table and the second frequency table, respectively, the transmitting direction of each grating lobe can be changed similarly to the above embodiment. Therefore, the two grating lobes (transmission beams) can scan in the given detection range.

FIGS. 18A to 21B are views, each illustrating a simulation result of calculating the transmitting direction in which the grating lobe occurs in the configuration of Modification 2.

In the simulations, the pitch of the transmission elements 11a may be set as 2.5 mm. The number of transmission elements 11a may be set as 96. Moreover, the first set of electric signals and the second set of electric signals may be changed to each frequency assigned to the first frequency table and the second frequency table, respectively. Moreover, the phase of the electric signal applied to each transmission element 11a may be set similar to FIG. 17.

FIGS. 18A to 19C are simulation results when applying the first set of electric signals at the frequencies of 130, 140, 150 160, and 170 kHz to the transmission elements 11a of the group GR1. Moreover, FIGS. 20A to 21B are simulation results when applying the second set of electric signals at the frequencies of 135, 145, 155, and 165 kHz to the transmission elements 11a of the group GR2.

As illustrated in FIGS. 18A to 19C, when the electric signals at the frequencies of 130, 140, 150, 160, and 170 kHz are applied to the transmission elements 11a of the group GR1, the grating lobes may occur near different angles D11, D12, D13, D14, and D15. These five grating lobes may cover a range of −50° to −36° in general. Therefore, by changing the frequency of the electric signals applied to the transmission elements 11a of the group GR1 as described above, the grating lobes occurring from the transmission elements 11a of the group GR1 can scan the range of −50° to −36°.

Moreover, as illustrated in FIGS. 20A to 21B, when the electric signals at the frequencies of 135, 145, 155, and 165 kHz are applied to the transmission elements 11a of the group GR2, the grating lobes may occur near different angles D21, D22, D23, and D24. These four grating lobes may cover a range of −34° to −27° in general. Therefore, by changing the frequency of the electric signals applied to the transmission elements 11a of the group GR2 as described above, the grating lobes occurring from the transmission elements 11a of the group GR2 can scan the range of −34° to −27°.

As described above, the grating lobes formed by the transmission elements 11a of the group GR1 under the simulation condition described above can cover an angle range of 14° (−50° to −36°) in general, and the grating lobe formed by the transmission elements 11a of the group GR2 can cover an angle range of 7° (−34° to −27°) in general. As the angle ranges of the groups GR1 and GR2 are integrated, the two grating lobes can cover an angle range of 23° (−50° to −27°) in general. That is, the angle of visibility of 23° can be realized.

Therefore, also according to the configuration of Modification 2, one of the grating lobes caused by the transmission elements 11a of the group GR1 and one of the grating lobes caused by the transmission elements 11a of the group GR2 can scan the angle range of about 23°.

Note that, according to the configuration of Modification 2, the two grating lobes may occur by the transmission elements 11a of the group GR1 and the group GR2 as illustrated in the respective simulation results. In this case, as for the detection of the target object, only one of the two grating lobes (e.g., the grating lobe at the minus side in the simulations of FIGS. 18A to 21B) is used, for example. For example, the angle range of the reception beam RB0 is set so that the other grating lobe falls out from the range of the reception beam RB0. Therefore, by performing the processings of FIGS. 13A to 14 using similar circuit configuration as FIGS. 11 to 12B, the detection image of the given detection range can be displayed on the display unit 125.

Other Modifications

In the above embodiment, as illustrated in FIGS. 12A and 12B, after the frequency component at each frequency is extracted from the reception signal, the beamforming processing then performs a separation into the signal in each direction. However, the reception signal may be first separated into the signal in each direction by the beamforming processing, and then the frequency component of each frequency may be extracted from the separated signal in each direction. That is, the band-pass filter 203 and the beam synthesizing part 204 of FIG. 12A may be interchanged, or the FFT 211 and the frequency extracting part 212, and the beam synthesizing part 204 of FIG. 12B may be interchanged.

Moreover, in the above embodiment, although the plurality of reception elements 31a are provided as illustrated in FIG. 10, the reflection wave may be received by a single reception element 31a. Note that, in this case, since the beamforming cannot be performed to the reception beam, the bearing of the reception beam (the direction θ1 of FIG. 10) is fixed. However, by extracting the frequency component of the reception signal from the reception beam of this bearing, the intensity data in each direction of the vertical direction can be acquired. Therefore, by mapping the intensity data in each direction of the vertical direction, the two-dimensional detection image can be displayed.

Moreover, the number of transmission elements 11a is not limited to the number illustrated in the above embodiment, and it may be other numbers as long as the plurality of kinds of grouping configurations are realizable. Moreover, three or more kinds of grouping configurations may be set for the plurality of transmission elements 11a included in the transmission array 11, and therefore, the number of transmission elements 11a included in each group is not limited to the number described in the above embodiment and modifications. In any of the cases, the grating lobes are formed as the transmission waves so as to correspond to the number of grouping configurations.

Moreover, the grating lobes formed by the transmission elements 11a of each group may not necessarily be clearly separated, and may be partially overlapped.

Moreover, although in the above embodiment the transmission array and the reception array are disposed perpendicular to each other, the transmission array and the reception array may be disposed at an angle slightly offset from the perpendicular configuration.

Moreover, although in FIG. 14 the target detection device 1 (sonar, radar) is disposed in the ship 2, the target detection device 1 (sonar, radar) may be installed in a movable body other than the ship 2, or the target detection device 1 (sonar, radar) may be installed in a structure, other than the movable body, such as a buoy.

Note that various modifications are suitably possible for the embodiment of the present disclosure within the scope of the appended claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A target detection device, comprising:
a transmission array comprising a plurality of transmission elements configured to convert an electric signal into a transmission wave; and
a signal generator configured to generate a plurality of sets of electric signals including a first set of electric signals and a second set of electric signals different from the first set, each set being generated with different phase settings, wherein
the signal generator is configured to:
group the plurality of transmission elements according to a plurality of grouping configurations including a first grouping configuration and a second grouping configuration, in the first grouping configuration, the plurality of transmission elements being grouped into a plurality of groups each having p transmission elements, and, in the second grouping configuration, the plurality of transmission elements being grouped into a plurality of groups each having q transmission elements, said q being different from said p,
input the first set of electric signals to each group of the first grouping configuration, and
input the second set of electric signals to each group of the second grouping configuration,
wherein the plurality of transmission elements used in the first grouping configuration and the plurality of transmission elements used in the second grouping configuration are the same.

2. The target detection device of claim 1, wherein the signal generator generates the first set of electric signals with equal phase shift between the electric signals, and generates the second set of electric signals with equal phase shift between the electric signals.

3. The target detection device of claim 1, wherein the plurality of elements are arranged at equal intervals.

4. The target detection device of claim 1, wherein said p is a multiple of a number of electric signals of the first set of electric signals.

5. The target detection device of claim 1, wherein said q is a multiple of a number of electric signals of the second set of electric signals.

6. The target detection device of claim 1, further comprising:
a mixing circuit configured to mix the first set of electric signals with the second set of electric signals, and input the mixed electric signals to the plurality of transmission elements.

7. The target detection device of claim 1, further comprising:
a switching circuit, inputted with the first set of electric signals and the second set of electric signals, configured to first output the first set of electric signals to the transmission array and then output the second set of electric signals to the transmission array.

8. The target detection device of claim 1, wherein a frequency of the first set of electric signals and a frequency of the second set of electric signals are different.

9. The target detection device of claim 1, wherein the signal generator changes a frequency of the first set of electric signals and the second set of electric signals.

10. The target detection device of claim 1, further comprising:
a reception array comprising at least one reception element configured to receive a reflection wave resulting from a reflection of the transmission wave on a target object and convert the reflection wave into a reception signal.

11. The target detection device of claim 10, further comprising:
processing circuitry configured to process the reception signal,
wherein the processing circuitry extracts, based on a frequency component of the reception signal, an equal frequency reception signal of the reflection wave corresponding to said frequency component.

12. The target detection device of claim 11, wherein by extracting a plurality of frequency components from the reception signal at different frequencies, the processing circuitry obtains the equal frequency reception signal corresponding to each frequency.

13. The target detection device of claim 11, wherein the processing circuitry calculates a frequency spectrum of the reception signal and, based on the frequency spectrum, obtains the equal frequency reception signal corresponding to each frequency.

14. The target detection device of claim 11, wherein the reception array comprises a plurality of reception elements; and the processing circuitry performs beamforming based on a reception signal generated from each of the reception elements, and calculates an incoming direction of the reflection wave from the target based on the beamforming.

15. The target detection device of claim 10, wherein the reception array comprises a plurality of reception elements; the reception array is different from the transmission array; and a reception beam formed based on a reception signal generated from each of the reception elements intersects a transmission beam formed by the transmission array.

16. The target detection device of claim 1, wherein the target detection device is a sonar that detects underwater targets.

17. The target detection device of claim 1, wherein the target detection apparatus is a radar that detects targets in air.

18. A method of detecting a target by transmitting a transmission wave from a transmission array having a plurality of transmission elements configured to convert an electric signal into a transmission wave, comprising:

grouping the plurality of transmission elements according to a plurality of grouping configurations including a first grouping configuration and a second grouping configuration, in the first grouping configuration, the plurality of transmission elements being grouped into a plurality of groups each having p transmission elements, and, in the second grouping configuration, the plurality of transmission elements being grouped into a plurality of groups each having q transmission elements, said q being different from said p;

generating a plurality of sets of electric signals including a first set of electric signals and a second set of electric signals different from the first set, each set being generated with different phase settings;

inputting the first set of electric signals to each group of the first grouping configuration; and inputting the second set of electric signals to each group of the second grouping configuration, wherein the plurality of transmission elements used in the first grouping configuration and the plurality of transmission elements used in the second grouping configuration are the same.

* * * * *